(12) United States Patent
Nakagawa

(10) Patent No.: US 12,235,202 B2
(45) Date of Patent: Feb. 25, 2025

(54) FLOW CYTOMETER PERFORMANCE EVALUATION METHOD AND STANDARD PARTICLE SUSPENSION

(71) Applicant: ThinkCyte K.K., Tokyo (JP)

(72) Inventor: Keiji Nakagawa, Tokyo (JP)

(73) Assignee: ThinkCyte K.K., Tokyo (JP)

( * ) Notice: Subject to any disclaimer, the term of this patent is extended or adjusted under 35 U.S.C. 154(b) by 151 days.

(21) Appl. No.: 17/847,478

(22) Filed: Jun. 23, 2022

(65) Prior Publication Data

US 2022/0317020 A1   Oct. 6, 2022

Related U.S. Application Data

(63) Continuation of application No. PCT/JP2020/048503, filed on Dec. 24, 2020.

(30) Foreign Application Priority Data

Dec. 27, 2019   (JP) ................. 2019-238089

(51) Int. Cl.
*G01N 15/14* (2024.01)
*G01N 15/10* (2024.01)
*G01N 15/149* (2024.01)

(52) U.S. Cl.
CPC ..... *G01N 15/1468* (2013.01); *G01N 15/1012* (2013.01); *G01N 15/1459* (2013.01); *G01N 2015/1014* (2024.01); *G01N 15/149* (2024.01)

(58) Field of Classification Search
CPC ............. G01N 15/1468; G01N 15/149; G01N 15/1012; G01N 15/1429; G01N 15/1459; G01N 2015/1014; G01N 2015/1497

(Continued)

(56) References Cited

U.S. PATENT DOCUMENTS 4,537,861 A   8/1985   Elings et al.
5,007,737 A   4/1991   Hirleman, Jr.
(Continued)

FOREIGN PATENT DOCUMENTS

CN   1302229 A   7/2001
CN   1330151 A   1/2002
(Continued)

OTHER PUBLICATIONS

Ota, S. et al., Ghost Cytometry, Science. Jun. 15, 2018; 360 (6394): 1246-1251.
(Continued)

*Primary Examiner* — Michael A Lyons
(74) *Attorney, Agent, or Firm* — WILSON SONSINI GOODRICH & ROSATI

(57) ABSTRACT

A method of evaluating performance of a flow cytometer configured to use a combination of two or more types of calibration particles having different morphologies from each other, includes a first classification step of classifying the calibration particles from each other based on a first optical characteristic by the flow cytometer which is an evaluation target, a second classification step of classifying the calibration particles from each other based on a second optical characteristic which is classifiable at a spatial resolution lower than a spatial resolution at which the first optical characteristic is classified, and the evaluation step of evaluating one or both of particle classification performance and a resolution of the flow cytometer based on a first classification result assessed in the first classification step and a second classification result assessed in the second classification step.

21 Claims, 9 Drawing Sheets

SIGNAL OF SCATTERING INFORMATION

SIGNAL OF FLUORESCENCE INFORMATION

SIGNAL OF MORPHOLOGICAL INFORMATION

(58) Field of Classification Search
USPC .......................................................... 356/337
See application file for complete search history.

(56) References Cited

U.S. PATENT DOCUMENTS

| | | | |
|---|---|---|---|
| 5,017,497 | A | 5/1991 | Gerard De Grooth et al. |
| 5,483,469 | A | 1/1996 | Van Den Engh et al. |
| 6,064,473 | A | 5/2000 | Hironaga et al. |
| 6,249,341 | B1 | 6/2001 | Basiji et al. |
| 6,956,230 | B1 | 10/2005 | Gharib et al. |
| 7,012,738 | B1 | 3/2006 | Schwarte |
| 7,217,573 | B1 | 5/2007 | Oshida et al. |
| 7,812,303 | B2 | 10/2010 | Meyers et al. |
| 8,314,933 | B2 | 11/2012 | Cui et al. |
| 8,582,203 | B2 | 11/2013 | Dunsby |
| 9,069,175 | B2 | 6/2015 | Koebler et al. |
| 9,134,242 | B2 | 9/2015 | Shaffer et al. |
| 9,360,660 | B2 | 6/2016 | Yi et al. |
| 9,518,916 | B1 | 12/2016 | Pandev et al. |
| 9,645,377 | B2 | 5/2017 | Bosworth et al. |
| 9,915,598 | B2 | 3/2018 | Kim et al. |
| 10,646,160 | B2 | 5/2020 | Yelin et al. |
| 10,761,011 | B2 | 9/2020 | Ota et al. |
| 10,904,415 | B2 | 1/2021 | Horisaki et al. |
| 11,054,363 | B2 | 7/2021 | Ota et al. |
| 11,098,275 | B2 | 8/2021 | Ota et al. |
| 11,412,118 | B2 | 8/2022 | Horisaki et al. |
| 11,542,461 | B2 | 1/2023 | Ota et al. |
| 11,549,880 | B2 | 1/2023 | Horisaki et al. |
| 11,579,075 | B2 | 2/2023 | Ota et al. |
| 11,630,293 | B2 | 4/2023 | Ugawa et al. |
| 11,667,875 | B1 | 6/2023 | Nakagawa et al. |
| 11,788,948 | B2 | 10/2023 | Ota et al. |
| 11,861,889 | B2 | 1/2024 | Ota et al. |
| 11,867,610 | B2 | 1/2024 | Ota et al. |
| 11,906,722 | B2 | 2/2024 | Horisaki et al. |
| 2002/0041376 | A1 | 4/2002 | Kurozumi et al. |
| 2003/0142289 | A1* | 7/2003 | Ortyn ............... G01N 15/1012 356/28 |
| 2003/0162218 | A1 | 8/2003 | Emalfarb et al. |
| 2004/0061914 | A1 | 4/2004 | Miyawaki et al. |
| 2004/0189977 | A1 | 9/2004 | Nagai et al. |
| 2005/0002030 | A1 | 1/2005 | Kolp et al. |
| 2005/0046849 | A1 | 3/2005 | Cromwell et al. |
| 2005/0051466 | A1 | 3/2005 | Carter et al. |
| 2007/0091315 | A1 | 4/2007 | Brady et al. |
| 2007/0151343 | A1 | 7/2007 | Gross et al. |
| 2008/0195020 | A1 | 8/2008 | Cabuz et al. |
| 2008/0214412 | A1 | 9/2008 | Stahler et al. |
| 2009/0071225 | A1 | 3/2009 | Schilffarth |
| 2009/0093807 | A1 | 4/2009 | Hyde et al. |
| 2009/0153883 | A1 | 6/2009 | Shinoda |
| 2009/0190121 | A1 | 7/2009 | Hegyi et al. |
| 2009/0194702 | A1 | 8/2009 | Meyers et al. |
| 2009/0248318 | A1 | 10/2009 | Nagai et al. |
| 2009/0290156 | A1 | 11/2009 | Popescu et al. |
| 2010/0170796 | A1 | 7/2010 | Bhatia et al. |
| 2010/0284016 | A1 | 11/2010 | Teitell et al. |
| 2010/0294916 | A1 | 11/2010 | Meyers et al. |
| 2012/0001090 | A1 | 1/2012 | Takasaki et al. |
| 2012/0004514 | A1 | 1/2012 | Marugame |
| 2012/0069170 | A1 | 3/2012 | Gesley |
| 2012/0122084 | A1 | 5/2012 | Wagner et al. |
| 2012/0128264 | A1 | 5/2012 | Yazdanfar et al. |
| 2012/0200857 | A1 | 8/2012 | Sharpe et al. |
| 2013/0016335 | A1 | 1/2013 | Lo et al. |
| 2013/0078733 | A1 | 3/2013 | Holmes et al. |
| 2013/0102865 | A1 | 4/2013 | Mandelis et al. |
| 2013/0155499 | A1 | 6/2013 | Dixon |
| 2013/0163844 | A1 | 6/2013 | Ozaki et al. |
| 2013/0176533 | A1 | 7/2013 | Raffle et al. |
| 2013/0200277 | A1 | 8/2013 | Li et al. |
| 2013/0204538 | A1 | 8/2013 | Rich |
| 2013/0308122 | A1 | 11/2013 | Merchez et al. |
| 2013/0329226 | A1 | 12/2013 | Matsubara et al. |
| 2014/0073000 | A1 | 3/2014 | Sun et al. |
| 2014/0078352 | A1 | 3/2014 | Iwai |
| 2014/0098359 | A1 | 4/2014 | Gross et al. |
| 2014/0152801 | A1 | 6/2014 | Fine et al. |
| 2014/0236494 | A1 | 8/2014 | Kolandaivelu et al. |
| 2014/0293281 | A1 | 10/2014 | Yamamoto et al. |
| 2014/0353522 | A1 | 12/2014 | Wu et al. |
| 2014/0376816 | A1 | 12/2014 | Lagae et al. |
| 2015/0182178 | A1 | 7/2015 | Baturin et al. |
| 2015/0192767 | A1 | 7/2015 | Li et al. |
| 2015/0198584 | A1 | 7/2015 | Rajwa et al. |
| 2015/0233703 | A1 | 8/2015 | Martini et al. |
| 2015/0268244 | A1 | 9/2015 | Cho et al. |
| 2015/0276387 | A1 | 10/2015 | Kletter et al. |
| 2015/0377783 | A1 | 12/2015 | Kumer |
| 2016/0026900 | A1 | 1/2016 | Ando |
| 2016/0033328 | A1 | 2/2016 | Walters |
| 2016/0046958 | A1 | 2/2016 | Eberwine et al. |
| 2016/0069919 | A1 | 3/2016 | Holmes et al. |
| 2016/0125615 | A1 | 5/2016 | Shigaki et al. |
| 2016/0131891 | A1 | 5/2016 | Higaki |
| 2016/0169786 | A1 | 6/2016 | Albitar et al. |
| 2016/0223453 | A1 | 8/2016 | Jalali et al. |
| 2016/0231549 | A1 | 8/2016 | Bosworth et al. |
| 2016/0258856 | A1 | 9/2016 | Kim et al. |
| 2016/0258901 | A1 | 9/2016 | Kang et al. |
| 2016/0327779 | A1 | 11/2016 | Hillman et al. |
| 2016/0370266 | A1 | 12/2016 | White et al. |
| 2017/0045437 | A1 | 2/2017 | Ishimaru |
| 2017/0045451 | A1* | 2/2017 | Nolan ............... G01N 15/1429 |
| 2017/0052106 | A1 | 2/2017 | Hennig et al. |
| 2017/0058361 | A1 | 3/2017 | Ogawa et al. |
| 2017/0082531 | A1 | 3/2017 | Okada et al. |
| 2017/0184483 | A1 | 6/2017 | Bartels et al. |
| 2017/0212028 | A1* | 7/2017 | Correia De Matos Nolasco Lamas ............... G01N 15/1436 |
| 2017/0221194 | A1 | 8/2017 | Ebstein |
| 2017/0227466 | A1 | 8/2017 | Lo et al. |
| 2017/0322137 | A1 | 11/2017 | Feher et al. |
| 2017/0328826 | A1 | 11/2017 | Diebold et al. |
| 2017/0332933 | A1 | 11/2017 | Krishnaswamy et al. |
| 2018/0127823 | A1 | 5/2018 | Shekhar et al. |
| 2018/0208412 | A1 | 7/2018 | Gilbert et al. |
| 2018/0246030 | A1 | 8/2018 | Ota et al. |
| 2018/0251833 | A1 | 9/2018 | Daugharthy et al. |
| 2018/0327699 | A1 | 11/2018 | Ota et al. |
| 2019/0005351 | A1 | 1/2019 | Zhou et al. |
| 2019/0339380 | A1 | 11/2019 | Marks |
| 2019/0355440 | A1 | 11/2019 | Ramjeet et al. |
| 2019/0383719 | A1 | 12/2019 | Corbett et al. |
| 2020/0027020 | A1 | 1/2020 | Kamesawa et al. |
| 2021/0080382 | A1 | 3/2021 | Alfano et al. |
| 2021/0161385 | A1 | 6/2021 | Ben-Yakar et al. |
| 2021/0190669 | A1 | 6/2021 | Ota et al. |
| 2021/0310053 | A1 | 10/2021 | Sugimoto |
| 2023/0012588 | A1 | 1/2023 | Imai et al. |
| 2023/0090631 | A1 | 3/2023 | Imai et al. |
| 2023/0237789 | A1 | 7/2023 | Ota et al. |
| 2024/0133792 | A1 | 4/2024 | Ota et al. |
| 2024/0241038 | A1 | 7/2024 | Ota et al. |
| 2024/0303980 | A1 | 9/2024 | Ota et al. |

FOREIGN PATENT DOCUMENTS

| | | |
|---|---|---|
| CN | 101320252 A | 12/2008 |
| CN | 101714212 A | 5/2010 |
| CN | 101925809 A | 12/2010 |
| CN | 101939633 A | 1/2011 |
| CN | 102272580 A | 12/2011 |
| CN | 102331411 A | 1/2012 |
| CN | 102495467 A | 6/2012 |
| CN | 102890049 A | 1/2013 |
| CN | 103582809 A | 2/2014 |
| CN | 103604737 A | 2/2014 |
| CN | 103837461 A | 6/2014 |
| CN | 103930768 A | 7/2014 |
| CN | 103942415 A | 7/2014 |
| CN | 104136907 A | 11/2014 |
| CN | 104154878 A | 11/2014 |

(56) References Cited

FOREIGN PATENT DOCUMENTS

| | | |
|---|---|---|
| CN | 104200114 A | 12/2014 |
| CN | 104736995 A | 6/2015 |
| CN | 104849874 A | 8/2015 |
| CN | 105005053 A | 10/2015 |
| CN | 105044897 A | 11/2015 |
| CN | 105181649 A | 12/2015 |
| CN | 105223582 A | 1/2016 |
| CN | 105574536 A | 5/2016 |
| CN | 105579828 A | 5/2016 |
| CN | 105651656 A | 6/2016 |
| CN | 105849275 A | 8/2016 |
| CN | 106068520 A | 11/2016 |
| CN | 106097437 A | 11/2016 |
| CN | 106267241 A | 1/2017 |
| CN | 106295251 A | 1/2017 |
| CN | 106520535 A | 3/2017 |
| CN | 109297888 A | 2/2019 |
| EP | 2602612 A1 | 6/2013 |
| EP | 2673618 A1 | 12/2013 |
| EP | 3264031 A1 | 1/2018 |
| EP | 3372985 A1 | 9/2018 |
| EP | 3499201 A1 | 6/2019 |
| EP | 3584564 A1 | 12/2019 |
| EP | 3807005 A1 | 4/2021 |
| EP | 4306931 A2 | 1/2024 |
| JP | S613032 A | 1/1986 |
| JP | S6279329 A | 4/1987 |
| JP | H01118747 A | 5/1989 |
| JP | H03216553 A * | 9/1991 |
| JP | H06102152 A * | 12/1994 |
| JP | H07270302 A | 10/1995 |
| JP | H07270314 A | 10/1995 |
| JP | H07325026 A | 12/1995 |
| JP | H09311102 A | 12/1997 |
| JP | 2002116133 A | 4/2002 |
| JP | 3444509 B2 | 9/2003 |
| JP | 2003526091 A | 9/2003 |
| JP | 2004150832 A | 5/2004 |
| JP | 2004279032 A | 10/2004 |
| JP | 2004286731 A | 10/2004 |
| JP | 2005069832 A | 3/2005 |
| JP | 2006520893 A | 9/2006 |
| JP | 2007048172 A | 2/2007 |
| JP | 2007281634 A | 10/2007 |
| JP | 2008523402 A | 7/2008 |
| JP | 2008539425 A | 11/2008 |
| JP | 2009115672 A | 5/2009 |
| JP | 2009180724 A | 8/2009 |
| JP | 2009180725 A | 8/2009 |
| JP | 2009210465 A | 9/2009 |
| JP | 2010203949 A | 9/2010 |
| JP | 4679507 B2 | 4/2011 |
| JP | 2011099848 A | 5/2011 |
| JP | 2011141444 A | 7/2011 |
| JP | 2011229409 A | 11/2011 |
| JP | 2011229410 A | 11/2011 |
| JP | 2012500385 A | 1/2012 |
| JP | 2013015357 A | 1/2013 |
| JP | 2013508775 A | 3/2013 |
| JP | 2013128438 A | 7/2013 |
| JP | 2013167582 A | 8/2013 |
| JP | 2013178232 A | 9/2013 |
| JP | 2013210287 A | 10/2013 |
| JP | 2014013234 A | 1/2014 |
| JP | 5418386 B2 | 2/2014 |
| JP | 5464244 B2 | 4/2014 |
| JP | 5534214 B2 | 6/2014 |
| JP | 5574407 B2 | 8/2014 |
| JP | 2014175819 A | 9/2014 |
| JP | 2014190748 A | 10/2014 |
| JP | 2014215852 A | 11/2014 |
| JP | 2015036799 A | 2/2015 |
| JP | 2015052663 A | 3/2015 |
| JP | 2015512029 A | 4/2015 |
| JP | 2015152594 A | 8/2015 |
| JP | 2016057172 A | 4/2016 |
| JP | 2016510418 A | 4/2016 |
| JP | 2016073210 A | 5/2016 |
| JP | 2016090292 A | 5/2016 |
| JP | 2016099685 A | 5/2016 |
| JP | 2016517526 A | 6/2016 |
| JP | 2016192007 A | 11/2016 |
| JP | 2017058361 A | 3/2017 |
| JP | 2018511060 A | 4/2018 |
| JP | 2018132501 A | 8/2018 |
| JP | WO2018181458 A1 | 2/2020 |
| WO | WO-03048345 A1 | 6/2003 |
| WO | WO-2006080314 A1 | 8/2006 |
| WO | WO-2006103920 A1 | 10/2006 |
| WO | WO-2006115663 A2 | 11/2006 |
| WO | WO-2006127967 A2 | 11/2006 |
| WO | WO-2007067999 A2 | 6/2007 |
| WO | WO-2010017001 A2 | 2/2010 |
| WO | WO-2010032452 A1 | 3/2010 |
| WO | WO-2011028109 A1 | 3/2011 |
| WO | WO-2011049965 A1 | 4/2011 |
| WO | WO-2012068287 A2 | 5/2012 |
| WO | WO-2012086195 A1 | 6/2012 |
| WO | WO-2012144886 A1 | 10/2012 |
| WO | WO-2012147804 A1 | 11/2012 |
| WO | WO-2013066896 A1 | 5/2013 |
| WO | WO-2013101675 A2 | 7/2013 |
| WO | WO-2014127379 A1 | 8/2014 |
| WO | WO-2014144585 A1 | 9/2014 |
| WO | WO-2014146062 A2 | 9/2014 |
| WO | WO-2015067734 A1 | 5/2015 |
| WO | WO-2015068834 A1 | 5/2015 |
| WO | WO-2015148560 A1 | 10/2015 |
| WO | WO-2016038796 A1 | 3/2016 |
| WO | WO-2016073985 A1 | 5/2016 |
| WO | WO-2016085571 A2 | 6/2016 |
| WO | WO-2016130489 A1 | 8/2016 |
| WO | WO-2016136801 A1 | 9/2016 |
| WO | WO-2017046988 A1 | 3/2017 |
| WO | WO-2017073737 A1 | 5/2017 |
| WO | WO-2017164936 A1 | 9/2017 |
| WO | WO-2018034241 A1 | 2/2018 |
| WO | WO-2018126205 A1 | 7/2018 |
| WO | WO-2018151206 A1 | 8/2018 |
| WO | WO-2018199080 A1 | 11/2018 |
| WO | WO-2019241443 A1 | 12/2019 |
| WO | WO-2020081819 A1 | 4/2020 |
| WO | WO-2021132484 A1 | 7/2021 |
| WO | WO-2021200911 A1 | 10/2021 |
| WO | WO-2021200960 A1 | 10/2021 |

OTHER PUBLICATIONS

PCT/JP2020/048503 International Search Report dated Mar. 9, 2021.
EP20907648.8 Partial Supplementary European Search Report dated Dec. 14, 2023.
Abolbashari, Mehrdad, et al. High dynamic range compressive imaging: a programmable imaging system. Optical Engineering, vol. 51, No. 7, 071407-1-071407-8 (2012).
Adachi, Hioraki, et al. Use of Ghost Cytometry to Differentiate Cells with Similar Gross Morphologic Characteristics. ARXIV.Org., 1-11, (2019).
Adjouadi, Malek. et al. Multidimensional Pattern Recognition and Classification of White Blood Cells Using Support Vector Machines. Particle & Particle Systems Characterization 22(2):107-118 (2005).
Baroud, Charles N., et al. Dynamics of microfluidic droplets. Lab on a Chip, vol. 10, 2032-2045 (2010).
Bruggner, Robert V. et al. Automated Identification of Stratifying Signatures in Cellular Subpopulations. Proceedings of the National Academy of Sciences 111(26):E2770-E2777 (2014).
Choi, Kerkil, et al. Compressive holography of diffuse objects. Applied Optics, vol. 49, No. 34, 1-10 (2010).
CN201680011390.X Office Action dated Apr. 9, 2020, and an English translation.
CN201680011390.X Office Action dated Nov. 29, 2019, and an English translation.

(56) References Cited

OTHER PUBLICATIONS

CN201680011390.X Office Action with Search Report dated Mar. 1, 2019, and a partial English translation.
CN201680062987.7 Office Action dated Dec. 30, 2019.
CN201680062987.7 Office Action with Search Report dated Dec. 30, 2019, and a Partial English translation.
CN201680062987.7 Office Action with Search Report dated Mar. 11, 2021, and a Partial English translation.
CN201680062987.7 Office Action with Search Report dated Sep. 10, 2020, and a Partial English translation.
CN201780062816.9 Office Action dated Jul. 17, 2020.
CN201880012120.X Office Action dated Dec. 23, 2021.
CN201880021362.5 Chinese Office Action with Search Report dated Mar. 31, 2023.
CN201980053558.7 Office Action dated Aug. 23, 2022, and an English translation.
CN201980053558.7 Office Action with Search report dated Dec. 2, 2021, and a partial English translation.
CN202111319130.8 Search Report dated Dec. 27, 2023.
Duarte, Marco, et al. Single-Pixel Imaging via Compressive Sampling. IEEE Signal Processing Magazine, vol. 25, 83-91 (2008).
EP16755545.7 Office Action dated Jun. 24, 2020.
EP16859965.2 European Search Report dated Aug. 16, 2019.
EP16859965.2 Office Action dated Jul. 18, 2022.
EP17841464.5 Extended European Search Report dated Jan. 28, 2020.
EP18753550.5 Extended European Search Report dated Feb. 19, 2020.
EP18775495.7 Extended Search Report dated Dec. 18, 2020.
EP19819019.1 Extended European Search Report dated Feb. 8, 2022.
EP19873817.1 Extended European Search Report dated Jul. 15, 2022.
EP20160755545.7 Extended European Search Report dated Aug. 24, 2018.
EP20160859965.2 Partial European Search Report dated May 6, 2019.
EP21779172.2 European Supplementary Search Report dated Mar. 14, 2024.
EP23195563.4 Extended European Search Report dated Jan. 9, 2024.
Han, Yuanyuan, et al. Imaging Cells in Flow Cytometer Using Spatial-Temporal Transformation. Scientific Reports 5:13267, 1-10 (2015).
Hassan, S. Sakira, et. al. Flow Cytometry-Based Classification in Cancer Research: a View on Feature Selection, Cancer Informatics, vol. 14, 75-85 (2015).
Hennig, Holger, et. al. An open-source solution for advanced imaging flow cytometry data analysis using machine learning. Methods, vol. 112, 201-210 (2017).
Horisaki, Ryoichi, et al. Single-pixel compressive diffractive imaging. Applied Optics, vol. 56, No. 5, 1353-1357 (2017).
Horisaki, Ryoichi, et al. Single-pixel compressive diffractive imaging with structured illumination. Applied Optics, vol. 56 No. 14, 4085-4089 (2017).
Horisaki, Ryoichi, et al. Single-shot phase imaging with a coded aperture. Optics Letters, vol. 39, No. 22, 1-4 (2014).
Joung, Julia, et al. Genome-scale CRISPR-Cas9 Knockout and Transcriptional Activation Screening. Nature Protocols, vol. 12, 828-863 (2017).
JP2017_502419 Office Action dated Aug. 21, 2018, and an English translation.
JP2017_502419 Office Action dated May 7, 2019, and an English translation.
JP2017_547891 Office Action dated Apr. 27, 2021, and an English translation.
JP2017_547891 Office Action dated Aug. 31, 2021, and an English translation.
JP2017_547891 Office Action dated Oct. 6, 2020, and an English translation.
JP2019-514527 Decision of Dismissal of Amendment dated Jul. 12, 2022.
JP2020-170808 Office Action dated Sep. 21, 2021.
JP2021-159163 Office Action dated Oct. 4, 2022.
JP2021_518859 Office Action dated Jun. 5, 2023, and an English translation.
JP2021_518859 Office Action dated Sep. 4, 2023, and an English translation.
JP2021_521403 Office Action dated May 7, 2024, and an English translation.
JP2021_521403 Office Action dated Sep. 4, 2023, and an English translation.
JP2021_567626 Office Action dated May 7, 2024, and an English translation.
JP2022-170844 Office Action dated Aug. 22, 2023.
JP2023_172195 Office Action dated Jun. 10, 2024, and an English translation.
Katkovnik, Vladimir, et al. Compressive sensing computational ghost imaging, 1-62 (2012). Retrieved from: https://pdfs.semanticscholar.org/4568/1fbc1143924f13c1800b8c1008be6c1241d8.pdf.
Katkovnik, Vladimir, et al. Compressive sensing computational ghost imaging. Journal of the Optical Society of America, vol. 29, No. 8, 1556-1567 (2012).
Katkovnik, Vladimir, et al. Phase retrieval via spatial light modulator phase modulation in 4f optical setup: numerical inverse imaging with sparse regularization for phase and amplitude. Journal of the Optical Society of America, vol. 29, No. 1, 105-116 (2012).
Katz, Ori, et al. Compressive ghost imaging. Applied Physics Letters, vol. 95, 2-5 (2009).
Krstenansky, John L., et al. Short model peptides having a high alpha-helical tendency: design and solution properties. Federation of European Biochemical Societies, vol. 242, No. 2, 409-413 (1989).
Lee, Byounghyo, et al. Single-shot Phase Retrieval via Fourier ptychographic microscopy. Optical Society of America, vol. 5, No. 8, 976-983 (2018).
Lee, Gyemin, et al. Transfer Learning for Auto-gating of Flow Cytometry Data, JMLR: Workshop and Conference Proceedings, Workshop on Unsupervised and Transfer Learning, vol. 27, 155-165 (2012).
Li, Enrong. et al. Ghost Imaging of a Moving Target With an Unknown Constant Speed. Applied Physics Letters 104:251120-1-251120-3 (2014).
Li, Xiaohui, et al. Ghost imaging for an axially moving target with an unknown constant speed. Photonics Research, vol. 3, No. 4, 153-157 (2015).
Liu, Ziji, et al. Real-time brightfield, darkfield, and phase contrast imaging in a light-emitting diode array microscope. Journal of Biomedical Optics, vol. 19, No. 10, 106002-1-106002-5 (2014).
Liutkus, Antoine, et al. Imaging With Nature: a Universal Analog Compressive Imager Using a Multiply Scattering Medium. Retrieved from: http://arxiv.org/vc/arxiv/papers/1309/1309.0425v1.pdf, arXiv.org, 1-15 (2013).
Liutkus, Antoine, et al. Imaging With Nature: Compressive Imaging Using a Multiply Scattering Medium. Scientific Reports, vol. 4, 1-13 (2014).
Mair, Florian. et al. The End of Gating? An Introduction to Automated Analysis of High Dimensional Cytometry Data. European Journal of Immunology 46(1):34-43 (2016). Published Online Nov. 30, 2015.
Meehan, Stephen. et al. AutoGate: Automating Analysis of Flow Cytometry Data. Immunologic Research 58(2-3):218-223 (2014).
Ni, Wanmao, et. al. Discrimination of malignant neutrophils of chronic myelogenous leukemia from normal neutrophils by support vector machine. Computers in Biology and Medicine, vol. 43, 1192-1195 (2013).
Nitta, Nao, et al. Intelligent Image-Activated Cell Sorting. Cell, vol. 175, 266-276 (2018).
PCT/JP2016/055412 International Search Report and Written Opinion dated May 17, 2016.
PCT/JP2016/082089 International Search Report and Written Opinion dated Jan. 24, 2017.

(56) References Cited

OTHER PUBLICATIONS

PCT/JP2017/029156 International Search Report dated Oct. 31, 2017.
PCT/JP2018/005237 International Search Report dated May 1, 2018.
PCT/JP2018/012708 International Search Report and Witten opinion dated Jul. 3, 2018.
PCT/JP2018/016584 International Search Report dated Jul. 17, 2018.
PCT/JP2020/048503 International Preliminary Report on Patentability dated Jul. 7, 2022.
PCT/JP2021/013478 International Preliminary Report on Patentability dated Oct. 13, 2022.
PCT/JP2021/013478 International Search Report dated Jun. 22, 2021.
PCT/JP2021/013564 International Search Report and Written Opinion dated Jun. 22, 2021.
PCT/US2019/036849 International Search Report and Written Opinion dated Sep. 19, 2019.
PCT/US2019/056743 International Search Report and Written Opinion dated Feb. 7, 2020.
Pian, Qi, et al. Time-resolved Hyperspectral Single-pixel Camera Implementation for Compressive Wide-Field Fluorescence Lifetime Imaging. Proceedings of the International Society for Optical Engineering, vol. 9701, 970115-1-970115-6 (2016).
Rajwa, Bartek et al. Automated Classification of Bacterial Particles in Flow by Multiangle Scatter Measurement and Support Vector Machine Classifier. Cytometry Part A, vol. 73A, Issue 4, 369-379 (2008).
Rota, Paolo, et. al. The Role of Machine Learning in Medical Data Analysis. A Case Study: Flow Cytometry. Proceedings of the 11th Joint Conference on Computer Vision, Imaging and Computer Graphics Theory and Applications, vol. 3, 305-312 (2016).
SH800S Cell Sorter. Automation from Set-up to Analysis, 1-3 (2016). Retrieved from https://www.sonyWO2021200960A1biotechnology.com/us/instruments/sh800s-cell-sorter/system/ .
Shalem, Ophir, et al. Genome-Scale CRISPR-Cas9 Knockout Screening in Human Cells. Science, vol. 343, 84-87 (2014).
Shibuya, Kyuki, et al. Monomolecular fluorescence imaging method based on ghost imaging by using circulatory pattern (second report). Proceedings of Japan Science and Technology Agency, Semestrial Meeting, 863-864 (2014).
Sosik, Heidi M., et. al. Automated taxonomic classification of phytoplankton sampled with imaging-in-flow cytometry. Limnology and Oceanography: Methods, vol. 5, 204-216 (2007).
Tsujioka, Katsumi, et al. Three-dimensional shape measurement system using optical spatial modulator and zoom camera. Fifth International Symposium on Instrumentation and Control Technology, vol. 5253, 504-507 (2003).
Ugawa, Masashi, et al. High-throughput optofluidic particle profiling with morphological and chemical specificity. Optics Letters, vol. 40, No. 20, 4803-4806 (2015).
U.S. Appl. No. 15/552,438 Notice of Allowance dated Jul. 17, 2020.
U.S. Appl. No. 15/552,438 Notice of Allowance dated Jun. 16, 2020.
U.S. Appl. No. 15/552,438 Office Action dated Apr. 12, 2019.
U.S. Appl. No. 15/552,438 Office Action dated Aug. 9, 2018.
U.S. Appl. No. 15/552,438 Office Action dated Nov. 12, 2019.
U.S. Appl. No. 15/771,180 Corrected Notice of Allowability dated Jul. 21, 2021.
U.S. Appl. No. 15/771,180 Notice of Allowance dated May 17, 2021.
U.S. Appl. No. 15/771,180 Office Action dated Apr. 23, 2019.
U.S. Appl. No. 15/771,180 Office Action dated Jul. 30, 2020.
U.S. Appl. No. 15/771,180 Office Action dated Jun. 8, 2020.
U.S. Appl. No. 15/771,180 Office Action dated Nov. 13, 2019.
U.S. Appl. No. 16/272,569 Notice of Allowance dated Aug. 12, 2020.
U.S. Appl. No. 16/272,569 Office Action dated Apr. 16, 2020.
U.S. Appl. No. 16/542,257 Notice of Allowance dated Aug. 30, 2022.
U.S. Appl. No. 16/542,257 Notice of Allowance dated Nov. 17, 2022.
U.S. Appl. No. 16/542,257 Office Action dated Nov. 16, 2021.
U.S. Appl. No. 16/562,262 Notice of Allowance dated Jan. 19, 2023.
U.S. Appl. No. 16/562,262 Office Action dated Jun. 14, 2022.
U.S. Appl. No. 16/584,535 Office Action dated Aug. 21, 2024.
U.S. Appl. No. 16/584,535 Office Action dated Dec. 4, 2023.
U.S. Appl. No. 16/584,535 Office Action dated Feb. 18, 2022.
U.S. Appl. No. 16/584,535 Office Action dated Jun. 14, 2023.
U.S. Appl. No. 16/584,535 Office Action dated Sep. 12, 2022.
U.S. Appl. No. 16/663,182 Notice of Allowance dated Dec. 15, 2022.
U.S. Appl. No. 16/663,182 Notice of Allowance dated Jan. 11, 2023.
U.S. Appl. No. 16/663,182 Office Action dated Apr. 27, 2022.
U.S. Appl. No. 16/936,138 Notice of Allowance dated Apr. 14, 2021.
U.S. Appl. No. 16/936,138 Notice of Allowance dated Jun. 8, 2021.
U.S. Appl. No. 16/936,138 Office Action dated Oct. 22, 2020.
U.S. Appl. No. 17/089,028 Notice of Allowance dated Apr. 19, 2022.
U.S. Appl. No. 17/089,028 Office Action dated Nov. 24, 2021.
U.S. Appl. No. 17/115,657 Notice of Allowance dated Aug. 4, 2023.
U.S. Appl. No. 17/115,657 Notice of Allowance dated Jun. 14, 2023.
U.S. Appl. No. 17/115,657 Office Action dated Jan. 20, 2023.
U.S. Appl. No. 17/231,725 Office Action dated Aug. 27, 2024.
U.S. Appl. No. 17/231,725 Office Action dated Feb. 26, 2024.
U.S. Appl. No. 17/336,720 Notice of Allowance dated Oct. 27, 2022.
U.S. Appl. No. 17/336,720 Office Action dated Apr. 14, 2022.
U.S. Appl. No. 17/351,117 Corrected Notice of Allowability dated Nov. 28, 2022.
U.S. Appl. No. 17/351,117 Corrected Notice of Allowability dated Sep. 23, 2022.
U.S. Appl. No. 17/351,117 Notice of Allowance dated Sep. 15, 2022.
U.S. Appl. No. 17/351,117 Office Action dated Apr. 22, 2022.
U.S. Appl. No. 17/935,696 Office Action dated Jun. 6, 2024.
U.S. Appl. No. 17/935,707 Office Action dated Aug. 9, 2024.
U.S. Appl. No. 18/056,432 Notice of Allowance dated Oct. 18, 2023.
U.S. Appl. No. 18/056,432 Office Action dated May 9, 2023.
U.S. Appl. No. 18/059,846 Notice of Allowance dated Aug. 22, 2023.
U.S. Appl. No. 18/059,846 Notice of Allowance dated Sep. 6, 2023.
U.S. Appl. No. 18/059,846 Office Action dated May 17, 2023.
U.S. Appl. No. 18/152,354 Notice of Allowance dated Aug. 23, 2023.
U.S. Appl. No. 18/152,354 Office Action dated Jul. 3, 2023.
U.S. Appl. No. 18/238,368 Notice of Allowance dated Apr. 3, 2024.
U.S. Appl. No. 18/238,368 Office Action dated Aug. 15, 2024.
U.S. Appl. No. 18/511,920 Office Action dated Jul. 5, 2024.
U.S. Appl. No. 18/512,356 Office Action dated May 28, 2024.
Van Meir, Erwin G., et al. Single cell monitoring of growth arrest and morphological changes induced by transfer of wild-type p53 alleles to glioblastoma cells. Proceedings of the National Academy of Science, Genetics, vol. 92, 1008-1012 (1995).
Voigt, Andrew P. et al. Consistent Quantitative Gene Product Expression:# 1. Automated Identification of Regenerating Bone Marrow Cell Populations Using Support Vector Machines. Cytometry Part A 89(11):978-986 (2016).
Wang, Xianwen. Research on Automatic Identification Algorithm of Cell Groups in Flow cytometry Data Based on Skew T-Hybrid Model. China Doctoral Dissertation Full text Database Information Technology Edition, vol. 11, 1-123 (2015).
Wu, Jiani. Analysis of High Dimentional Mass Cytometry Data Based on Support Vector Machine and Its Application in the Early Diagnosis of Acute Myelocytic Leukemia. Chinese Thesis for Master Degree Full Text Database, Medical and Health Technology Edition, No. 1, 1-79 (2016).

(56) References Cited

OTHER PUBLICATIONS

Wu, Jianjun, et al. Expression of an exogenous eukaryotic DNA methyltransferase gene induces transformation of NIH 3T3 cells. Proceedings of the National Academy of Science, Medical Sciences, vol. 90, 8891-8895 (1993).
Zhang, Leihong, et al. Study on Ghost Imaging via Compressive Sensing for a Reflected Object. Optik 124(16):2334-2338 (2013).
Zhou et al., Focusing on moving targets through scattering samples, 2014, Optica, vol. 1(4); pp. 227-232.

* cited by examiner

CALIBRATION BEAD C1:
CONTAINING TWO Fluorescent Particles FH2056-2 IN ONE AGAROSE GEL BEAD CALIBRATION BEAD C2:
CONTAINING ONE Fluorescent Particles FH2052-2 IN ONE AGAROSE GEL BEAD

FLOW CYTOMETER PERFORMANCE EVALUATION METHOD AND STANDARD PARTICLE SUSPENSION

CROSS-REFERENCE

The present application is a continuation application of International Application No. PCT/JP2020/048503, filed on Dec. 24, 2020, which claims priority to Japanese Patent Application No. 2019-238089, filed in Japan on Dec. 27, 2019, the contents of which are incorporated herein by reference.

TECHNICAL FIELD

The present invention relates to method of evaluating performance of a flow cytometer and a standard particle suspension.

BACKGROUND ART

A flow cytometer is an analytical device that uses a technique called a flow cytometry method, in which individual cells are dispersed in a fluid and the fluid is allowed to flow down to be optically analyzed. The flow cytometer is a cell measurement device mainly used when the cells are observed individually. In the flow cytometer, a method is widely used in which cells subjected to fluorescence staining by a fluorescence probe are arranged in the fluid in a row, and an intensity of fluorescence or scattered light generated by irradiating the cells flowing in a flow channel with laser light is analyzed.

In the measurement using the flow cytometer, it is generally performed to check whether or not the flow cytometer to be used is in a state suitable for the measurement and to perform adjustment in advance as needed. In order to perform such calibration, a method using a suspension in which fine beads or the like are suspended is already known. For example, a standard particle suspension for a flow cytometer containing polystyrene-based polymer particles having the same scattered light intensity as bacteria and polyvinyl acetate particles having the same fluorescence intensity as bacteria after staining is disclosed (Patent Document 1). In addition, in the widely used flow cytometer, the state of the flow cytometer is checked by flowing commercially available polystyrene fluorescence beads having a substantially spherical shape and checking the fluorescence intensity distribution generated from the beads.

In recent years, with the active movement toward the practical application of new treatment methods, such as regenerative medicine using induced pluripotent stem cells (iPS cells) and other stem cells, or immunotherapy using chimeric antigen receptor T cells (CAR-T), there is a strong demand for measuring one or more cells from a group of cells and performing analysis on an individual cell basis. However, with the flow cytometer in the related art, which evaluates the characteristics of evaluation targets based on the fluorescence brightness or the total amount of scattered light, it is difficult to classify individual cells based on morphological information, such as the shapes of cells or the distribution of organelles.

In the flow cytometry method, for example, an imaging cytometer that generates two-dimensional images of the cells to classify the cells is known as the related art, in which the fluorescently labeled cells allowed to flow down in the flow channel are irradiated to acquire the fluorescence brightness emitted from each of the cells. On the other hand, a technique of directly analyzing the cells from measurement data without converting the morphological information of the cells into their two-dimensional images is developed in recent years, and the ghost cytometry technique is known as an example thereof (Non-Patent Document 1). The ghost cytometry technique is a single-pixel compressed imaging technique of capturing a target image by using the movement of a cell that is the measurement target that passes over optically structured illumination. A flow cytometer using the ghost cytometry technique, for example, in which a cell is irradiated with the structured illumination to classify the cell directly from a time-series waveform of the obtained optical signal, can provide a high-speed, high-sensitivity, low-cost, and compact flow cytometer (Patent Document 2). In addition, in the flow cytometer using the ghost cytometry technique, the target cells can be classified or discriminated without labeling, such as fluorescent staining, based on the model created in advance by machine learning. In the quality control of the cells produced for the regenerative medicine or the cell therapy, there is an increasing need for the technique of classifying or discriminating target cells without such labeling.

CITATION LIST

Patent Documents

[Patent Document 1]
  Japanese Unexamined Patent Publication First Publication No. 2004-150832
[Patent Document 2]
  PCT International Publication No. WO2017/073737

Non-Patent Document

[Non-Patent Document 1]
  "Science", Jun. 15, 2018, Vol. 360, No. 6394, p. 1246-1251

SUMMARY OF INVENTION

Technical Problem

The standard particle suspension for a flow cytometer disclosed in Patent Document 1 is used for a flow cytometer that classifies bacteria based on the total amount of the scattered light intensities or the fluorescence intensities, and is insufficient to evaluate the classification performance of a flow cytometer having a higher resolution, such as a flow cytometer using the ghost cytometry technique.

In the flow cytometer that classifies the cells using an imaging technique, an image-based SN ratio and the like is used to evaluate the performance. However, for the flow cytometer in which two-dimensional images making visual judgement possible are not mediated, such as the one using the ghost cytometry technique, no convenient method to evaluate its cell classification performance exists until now.

Therefore, in the same manner, in the flow cytometry using the ghost cytometry technique in which the morphological information of the cells, which are the measurement targets, is directly acquired from time-series waveform information of the optical signal and the cells are classified into the target cells, there is a demand for a method which can easily evaluate the classification performance of the flow cytometer.

The present invention has been made in view of the above points, and is to provide a standard particle suspension that can easily evaluate the classification performance of a flow cytometer, such as a flow cytometer based on the ghost cytometry technique, in which the morphological information is directly acquired from the time-series waveform information of the optical signal without using the two-dimensional image. In the flow cytometer, the measurement targets, such as cells, are classified at a spatial resolution higher than that of the flow cytometer evaluating the measurement targets based on the total amount of the scattered light intensities or the fluorescence intensities.

Solution to Problem

The present invention has been made to solve the above problems, and an aspect of the present invention relates to a method of evaluating performance of a flow cytometer configured to use two or more types of calibration particles having different morphologies from each other in combination. The method of evaluating performance of a flow cytometer includes a first classification step of classifying the calibration particles from each other based on a first optical characteristic using the flow cytometer which is an evaluation target, a second classification step of classifying the calibration particles from each other based on a second optical characteristic which is classifiable at a spatial resolution lower than a spatial resolution at which the first optical characteristic is classified, and an evaluation step of evaluating one or both of particle classification performance and resolution of the flow cytometer based on a first classification result assessed in the first classification step and a second classification result assessed in the second classification step.

In addition, in the method of evaluating performance of a flow cytometer according to an aspect of the present invention, the two or more types of calibration particles are used in a form in which the combination of the two or more types of calibration particles is mixed in advance and contained in a standard particle suspension.

In addition, in the method of evaluating performance of a flow cytometer according to an aspect of the present invention, the flow cytometer is a flow cytometer configured to directly classify the calibration particles from time-series waveform information of the optical signals acquired based on the first optical characteristic without using two-dimensional images of the calibration particles.

In addition, in the method of evaluating performance of a flow cytometer according to an aspect of the present invention, the flow cytometer is a flow cytometer based on the ghost cytometry technique, and the calibration particles are classified based on the morphological information reflected in the optical signal detected as the first optical characteristic.

In addition, another aspect of the present invention relates to a standard particle suspension for evaluating performance of a flow cytometer, in which the standard particle suspension contains a combination of two or more types of calibration particles. In the standard particle suspension for evaluating performance of a flow cytometer, the two or more types of calibration particles are different in the first optical characteristic from each other and different in the second optical characteristic from each other, the second optical characteristics being classifiable even at a spatial resolution lower than the spatial resolution at which the first optical characteristics are classified.

In addition, in the standard particle suspension according to an aspect of the present invention, the two or more types of calibration particles further have third optical characteristics which are substantially the same as each other.

In addition, in the standard particle suspension according to an aspect of the present invention, the third optical characteristic is an intensity of scattered light emitted from the calibration particles in response to the light irradiated to the calibration particles.

In addition, in the standard particle suspension according to an aspect of the present invention, the first optical characteristic is a characteristic regarding a morphology of the calibration particles. That is, in the standard particle suspension described above, the first optical characteristic is the characteristic regarding the morphology of the calibration particles reflected in the optical signals acquired in the present invention.

In addition, in the standard particle suspension according to an aspect of the present invention, the second optical characteristic is one or both of a wavelength and an intensity of fluorescence emitted from the calibration particles in response to irradiated light.

In addition, in the standard particle suspension according to an aspect of the present invention, the specific gravity of the calibration particles with respect to the standard particle suspension is in a predetermined range from 1.

In addition, in the standard particle suspension according to an aspect of the present invention, the size of the calibration particles is 0.1 μm or greater and 100 μm or smaller.

In addition, in the standard particle suspension according to an aspect of the present invention, the calibration particles are composed of materials containing agarose gel, polyethylene glycol, and polystyrene.

In addition, in the standard particle suspension according to an aspect of the present invention, the flow cytometer which is an evaluation target is a flow cytometer configured to directly classify the calibration particles from time-series waveform information of the optical signals acquired based on the first optical characteristic without using two-dimensional images of the calibration particles.

In addition, in the standard particle suspension according to an aspect of the present invention, the flow cytometer is a flow cytometer based on the ghost cytometry technique, and the calibration particles are classified based on morphological information reflected in the optical signal detected as the first optical characteristic.

Advantageous Effects of Invention

According to the present invention, in the flow cytometer using the ghost cytometry technique in which the measurement targets can be classified at a spatial resolution higher than that of the flow cytometer in the related art in which the measurement targets are evaluated based on the total amount of the scattered light intensities or the fluorescence intensities, the classification performance thereof can be easily evaluated.

DESCRIPTION OF EMBODIMENTS

The First Embodiment

In the following, an embodiment of the present invention will be described in detail with reference to the accompanying drawings.

A standard particle suspension L according to the present embodiment is poured into the flow cell of a flow cytometer and used to evaluate the classification performance of the flow cytometer. The flow cytometer whose classification performance is evaluated using the standard particle suspension L according to the present embodiment is, for example, a flow cytometer that performs the measurement based on the ghost cytometry technique, and is a flow cytometer that has a spatial resolution higher than that of the flow cytometer in the related art that evaluates the measurement target based on the total amount of the fluorescence intensities or the scattered light intensities. In the flow cytometer that makes measurements based on the ghost cytometry technique, particles containing substantially the same total amount of fluorescence intensities but different in morphologies can be classified by the differences in the fluorescence distribution due to the differences in the morphology of the particles. That is, in the present embodiment, the classification performance higher than that of the flow cytometer in the related art refers to, for example, the classification performance similar to the classification performance of a flow cytometer using the ghost cytometry technique that can classify or discriminate target cells based on the morphologies of the cells. That is to say, the classification performance higher than that of the flow cytometer in the related art in the present embodiment is the classification performance that can recognize the minute differences in the morphology of the measurement targets which cannot be classified by the flow cytometer in the related art.

In the following description, the flow cytometer that evaluates the classification performance using the standard particle suspension L according to the present embodiment is described using a flow cytometer that performs its measurement based on the ghost cytometry technique as an example. However, the standard particle suspension L according to the present embodiment can be similarly used for the flow cytometer that can extract morphological information of the measurement target without conversion them into image information at a spatial resolution higher than that of the flow cytometer in the related art that evaluates the evaluation target based on the total amount of the fluorescence intensities or the scattered light intensities. In addition, in the following description, a flow cytometer that evaluates its measurement targets based on the total amount of the fluorescence intensities or the scattered light intensities may be described as the flow cytometer in the related art.

Figure 1:
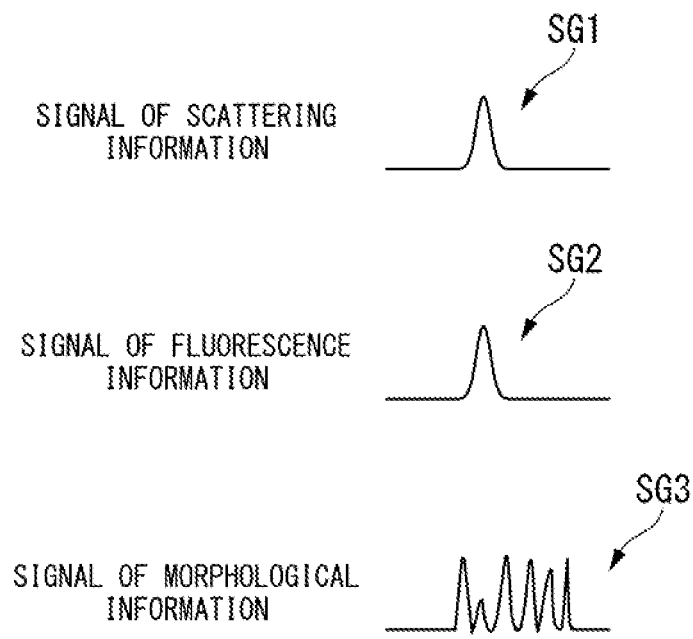
FIG. 1 is a diagram showing an example of signals (time-series waveforms of optical signals) obtained when the standard particle suspension according to the first embodiment of the present invention is measured by a flow cytometer.

FIG. 1 shows an example of signals obtained when the standard particle suspension L is measured by a flow cytometer which is the evaluation target of the classification performance. The standard particle suspension L contains two or more types of particles for evaluating the classification performance of the flow cytometer which is the evaluation target. It should be noted that, in the following description, the particles contained in the standard particle suspension are described as calibration particles for evaluating the classification performance of the flow cytometer which is the evaluation target. In addition, in the following description, an example will be described in which the standard particle suspension L contains two types of particles, a particle 1 and a particle 2.

A signal SG1 is a signal of scattering information in which the intensities of the scattered light are acquired as the total amount. A signal SG2 is a signal of fluorescence information in which the fluorescent brightness is acquired as the total amount. A signal SG3 is a signal capable of acquiring the morphological information of the calibration particles contained in the standard particle suspension L at a spatial resolution higher than the signal SG1 and the signal SG2. An example of the signal SG3 is a signal of a time-series optical signal detected by the ghost cytometry technique. When the standard particle suspension L is measured using the flow cytometer which is the evaluation target, the signal SG3 is acquired based on the first optical characteristic of the calibration particles contained in the standard particle suspension L, the signal SG2 is acquired based on their second optical characteristic, and the signal SG1 is acquired based on their third optical characteristic.

The morphological information includes information indicating an outer shape or an internal structure of the calibration particles. The morphological information having a high spatial resolution that enables classification or discrimination of the target cells is directly acquired from the signal SG3 without labeling such as fluorescence staining. The signal SG3 is a signal that can acquire the morphological information at a spatial resolution higher than the information obtained by measuring the total amount of fluorescence in the signal SG2. An example of the signal SG3 is a time-series signal of the optical signal including the morphological information acquired by a flow cytometer using the ghost cytometry technique.

In the flow cytometer using the ghost cytometry technique, by a configuration of the structured illumination that irradiates illumination light, by imparting a specific illumination pattern, to the measurement target that moves in a flow channel, or by a configuration of structured detection in which light, such as the fluorescence or the scattered light, emitted from the measurement target by the irradiation of the illumination light is detected by adding a specific pattern, the morphological information of the measurement target can be compressed and imparted to the optical signal detected by an optical detector. Therefore, the time-series waveforms of the optical signals obtained by detecting the particle 1 and the particle 2 acquired by the flow cytometer using the ghost cytometry technique are different from each other, reflecting the differences in morphology between the particle 1 and the particle 2, and a classification model is created by using the time-series waveforms of the optical signals at which the particle 1 and the particle 2 are detected as training data, so that the classification can be performed based on the differences in the morphology between the particle 1 and the particle 2 based on the model. That is, the first optical characteristic of the calibration particles contained in the standard particle suspension L according to the present embodiment is a characteristic (morphological characteristic) regarding the morphology of the particles, and the calibration particles are classified based on the optical signals reflecting the differences in the first optical characteristic. In the example of the flow cytometer using the ghost cytometry technique, the first optical characteristic described above is reflected in the detected optical signal by the flow cytometer.

It should be noted that the types of the light detected in the flow cytometer using the ghost cytometry technique may include any of transmitted light, fluorescence, scattered light, interfering light, diffracted light, and polarized light emitted from or transmitted through the calibration particles, and suitable light is selected according to the measurement target of the flow cytometer which is the evaluation target. In the present embodiment, an example of measuring diffracted lights transmitted through the calibration particles is described.

It should be noted that it is possible to obtain information on the morphology of the calibration particle from the scattering information acquired as the total amount of the scattered light, which is a signal SG1. However, the classification performance of the flow cytometer to be evaluated using the standard particle suspension L according to the present embodiment is different in the spatial resolution of the obtained morphological information from that of the morphological information obtained from the scattering information by the signal SG1. The standard particle suspension L according to the present embodiment is used for evaluating whether or not the flow cytometer to be evaluated has the classification performance of a spatial resolution higher than that of the flow cytometer in the related art in which the scattering light information is acquired as the total amount of the scattered light. For example, in the cell sorter in the related art, only the total amount of the intensities of the fluorescence signals emitted from the cells is used for the cell classification, and fluorescence morphological information or fluorescence localization of the cells is not used for the classification. On the other hand, in the flow cytometer to be evaluated using the standard particle suspension L, for example, cells are classified based on their fine morphological information such as the fluorescence morphological information or the fluorescence localization of the cells.

Figure 2:
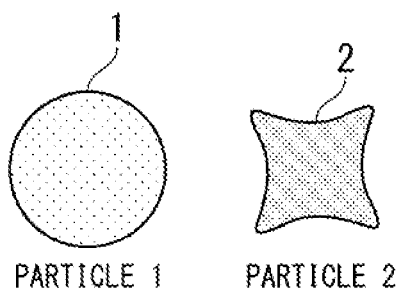
FIG. 2 is a diagram showing an example of the morphologies of calibration particles contained in the standard particle suspension according to the first embodiment of the present invention.

FIG. 2 shows an example of the morphologies of the calibration particles contained in the standard particle suspension L according to the present embodiment. The standard particle suspension L contains the particle 1 and the particle 2. It should be noted that, in the following description, an example in which two types of calibration particles of the particle 1 and the particle 2 are mixed in advance in the standard particle suspension L and contained in the suspension is described. However, the standard particle suspension according to the present invention can be used by a method in which two types particles of the particle 1 and the particle 2 are separately provided and the suspension prepared individually for each particle is used in combination when the classification performance of a flow cytometer is evaluated.

As an example, the particle 1 and the particle 2 are fine particles having a size of about 0.1 μm to 100 μm, and more desirably have a size of 1 μm or greater and 100 μm or smaller. It is desirable that the calibration particles contained in the standard particle suspension L according to the present embodiment have the same size as the measurement targets for the morphological classification. In a case in which the measurement targets for classification are cells, the particle size of the calibration particles is more desirably 5 μm or greater and 40 μm or smaller, and still more suitably 10 μm or greater and 30 μm or smaller. The size of the calibration particles contained in the standard particle suspension L may be selected according to the size of the measurement targets for morphological classification and the sensitivity required for the flow cytometer.

The particle 1 and the particle 2 contained in the standard particle suspension L according to the present embodiment have different morphologies from each other. The morphologies of the particle 1 and the particle 2 can be selected according to the morphology of the measurement targets and the sensitivity required for the flow cytometer which is the evaluation target. Here, the morphology in the present embodiment includes, for example, the outer shape of a particle and the internal structure of a particle. In the present embodiment, as an example, the particle 1 and the particle 2 have different outer shapes from each other. As shown in FIG. 2, the particle 1 has a substantially spherical shape, and the particle 2 has a shape having plural convex portions. It should be noted that, an example of the particles having mutually different internal structures of the particles from each other is described in the embodiment described below.

The particle 1 and the particle 2 have different fluorescence characteristics from each other. The fluorescence characteristic is, for example, one or both of the wavelength and the intensity of the fluorescence emitted by the particles when the particles are irradiated with laser light. For example, by staining at least one of the particle 1 and the particle 2 with a fluorescence dye, the particle 1 and the particle 2 have different fluorescence characteristics from each other. The particle 1 and the particle 2 may be stained with different types of fluorescence dyes from each other. It should be noted that the staining with the fluorescence dye may be performed at the same time when the calibration particles contained in the standard particle suspension L are prepared. Alternatively, the calibration particles may be stained after their preparation. The different fluorescence characteristics of the particle 1 and the particle 2 from each other are examples of the second optical characteristics of the calibration particles contained in the standard particle suspension L according to the present embodiment. The second optical characteristic is an optical characteristic for performing correct labeling to distinguish the particle 1 and the particle 2. In addition, the second optical characteristic is also used when the training data at the time of learning is acquired in the flow cytometer using the ghost cytometry technique. In addition, the differences in the second optical characteristic imparted to the particle 1 and the particle 2 are the differences in the optical characteristic that make the classification between the particle 1 and the particle 2 possible even in the flow cytometer in the related art. As a result, the classification performance of a flow cytometer to be evaluated can be assessed using the measurement values classified according to the second optical characteristic by using the flow cytometer in the related art as an index.

Figure 3:
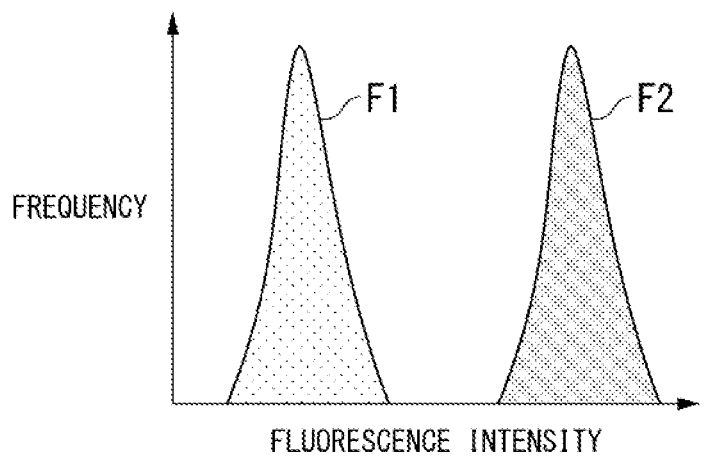
FIG. 3 is a diagram showing an example of fluorescence characteristics of calibration particles contained in the standard particle suspension according to the first embodiment of the present invention.

FIG. 3 shows an example of the fluorescence characteristics of the particle 1 and the particle 2. The graph F1 and the graph F2 are graphs showing a relationship between the fluorescence intensity and the frequency measured for the particle 1 and the particle 2, respectively. As shown in FIG. 3, regarding the particle 1 and the particle 2, fluorescence intensities emitted from them are different from each other. As a result, the particle 1 and the particle 2 can be classified from each other even in the flow cytometer in the related art based on the fluorescence intensity.

The particle 1 and the particle 2 have substantially the same scattered light intensities as each other. An example of the scattered light intensity is, for example, the intensity of the scattered light generated by the scattering of the light by the calibration particles when a laser light is irradiated to the calibration particles.

It should be noted that the types of scattered light include the forward scattered light, the side scattered light, and the back scattered light, but in the present embodiment, the type of scattered light is not limited, and the intensity of the scattered light is the intensity of at least one of the forward scattered light, the side scattered light, and the back scattered light.

Figure 4:
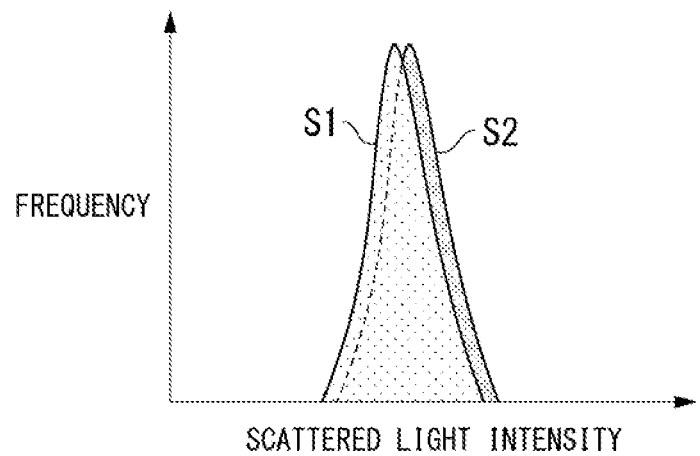
FIG. 4 is a diagram showing an example of scattered light characteristics of calibration particles contained in the standard particle suspension according to the first embodiment of the present invention.

FIG. 4 shows an example of the scattered light intensities of the particle 1 and the particle 2. The graph Si and the graph S2 are the graphs showing a relationship between the intensity of the scattered light and the frequency measured for each of the particle 1 and the particle 2. From the graph S1 and the graph S2, it can be seen that the characteristics of the scattered light measured for the particle 1 and the particle 2 are substantially the same. Although FIG. 4 shows a preferred example in which the figures of the graph S1 and the graph S2 substantially overlap, it should be noted that the distribution of the scattered light intensities of the particle 1 and the particle 2 is adequate if the graphs of these particles overlap to the extent that the two types of particles are difficult to be classified based on the scattered light intensity in the flow cytometer in the related art.

The particle 1 and the particle 2 are composed of, for example, materials having similar compositions so that they have substantially the same scattered light intensities as each other. The scattered light intensity depends on the shape of the calibration particle, but the compositions of the particle 1 and the particle 2 are selected to have substantially the same scattered light intensities as each other.

The materials of the particle 1 and the particle 2 are, for example, hydrogels, such as agarose gel or polyethylene glycol, or polystyrene.

In addition, in order to flow in a mixed state with the fluid in the flow cell of the flow cytometer, the specific gravity of the particle 1 and the particle 2 with respect to each standard particle suspension L is in a predetermined range from 1, and the predetermined range is, for example, 0.2. When the specific gravity of each of the particle 1 and the particle 2 is contained in a range of 0.8 or greater and 1.2 or smaller, for example, it is preferable as suspension is easy and the suspended state lasts for a long time.

The calibration particles contained in the standard particle suspension L according to the present embodiment can be prepared by known methods. For example, hydrogel particles similar to the target cells can be prepared by a method disclosed in U.S. Pat. No. 9,915,598 or PCT International Publication No. WO2016/130489. In addition, the particles contained in the standard particle suspension L according to the present embodiment can be prepared by containing commercially available fluorescence polystyrene beads in agarose gel beads as in an example described below.

In the following description, the flow cytometer which is the evaluation target of the classification performance is referred to as the evaluation target flow cytometer, and the flow cytometer that classifies calibration particles with identification labels and obtains the measured value which is an index of the classification performance of the evaluation target flow cytometer is referred to as the reference flow cytometer.

As described above, the particle 1 and the particle 2 have different morphologies from each other, but simultaneously have different fluorescence characteristics from each other. The particle 1 and the particle 2 are classified in advance by the reference flow cytometer based on the fluorescence characteristics (for example, the total amount of the fluorescence intensities detected at a specific wavelength) using the standard particle suspension L. Next, the particle 1 and the particle 2 are classified by the evaluation target flow cytometer based on the morphological information using the same standard particle suspension L.

The classification result based on the morphological information by the evaluation target flow cytometer is compared with the classification result based on the fluorescence characteristic obtained in advance by the reference flow cytometer, and the degree of coincidence between the two classification results is used as an index of the classification performance of the evaluation target flow cytometer. It should be noted that, in the following description, as an example, a case will be described in which the flow cytometer in the related art is adopted as the reference flow cytometer, but the flow cytometer having a spatial resolution higher than the flow cytometer in the related art can be used as the reference flow cytometer.

Here, the fluorescence characteristics imparted to the particle 1 and the particle 2 are the characteristics that can be classified even at a spatial resolution lower than the spatial resolution required for the evaluation target flow cytometer to classify the differences in morphology of the particles based on the first optical characteristic. Therefore, even when the spatial resolution having the reference flow cytometer is lower than the spatial resolution used when the evaluation target flow cytometer measures the morphological information, the reference flow cytometer can classify the particle 1 and the particle 2 using the fluorescence characteristic as an index. That is, even in a case in which the flow cytometer in the related art having a low spatial resolution is adopted as the reference flow cytometer, the calibration particles can be classified by the total amount of the fluorescence intensities detected at the specific wavelength imparted to the particle 1 and the particle 2, and the classification performance of the evaluation target flow cytometer is evaluated by comparison with the classification result.

In the embodiment described above, as an example, the case in which the reference flow cytometer and the evaluation target flow cytometer are different has been described, but the present invention is not limited to this. As the reference flow cytometer, the evaluation target flow cytometer itself may be used. In this case, the state of the evaluation target flow cytometer can be monitored by verifying whether or not the classification performance of the evaluation target flow cytometer has not changed from the past classification performance.

As described above, the standard particle suspension L contains the particle 1 and the particle 2 having different morphologies distinguishable from each other. The characteristic of the optical signal reflecting the differences in the morphology of the calibration particles contained in the standard particle suspension L is the first optical characteristic. In addition, the fluorescence characteristic of the calibration particles is an example of the second optical characteristic. That is, the second optical characteristic is one or both of the wavelength and the intensity of the fluorescence emitted from the particles of the calibration particles contained in the standard particle suspension L in response to the irradiated light. The fluorescence characteristics measured as the second optical characteristic in the present embodiment, such as the total amount of the fluorescence intensities, can be classified even at a spatial resolution lower than the spatial resolution at which the morphologies of particles, which are the first optical characteristics, can be classified.

In addition, as described above, the particle 1 and the particle 2 have substantially the same scattered light intensities as each other. Therefore, the evaluation target flow cytometer cannot discriminate the particle 1 and the particle 2 based on the total amount of the scattered light intensities.

The information regarding the total amount of the scattered light intensities is an example of the third optical characteristic. The information regarding the total amount of the scattered light intensities is the intensities of the scattered light emitted from the contained calibration particles in response to the light irradiated to the standard particle suspension L.

It should be noted that, in the present embodiment, the example has been described in which the number of types of calibration particles contained in the standard particle suspension L is 2, but the present invention is not limited to this. The standard particle suspension L may contain three or more types of calibration particles. These three or more types of calibration particles have the first optical characteristics which are different from each other among the different types of calibration particles and the second optical characteristics different from each other among the particles which can be classified even at a spatial resolution lower than the spatial resolution at which the first optical characteristics can be classified.

It should be noted that, in the present embodiment, as an example, the case has been described in which the light detected in the flow cytometer using the ghost cytometry technique is the diffracted light. In that case, the first optical characteristic is the morphological characteristic of the calibration particle, and the first optical characteristic is discriminated based on the diffracted light generated via the calibration particles, but the present invention is not limited to this. For example, the morphological characteristics of the calibration particles contained in the standard particle suspension can also be classified based on the scattered light. In that case, the evaluation target flow cytometer detects the scattered light from the calibration particles using the ghost cytometry technique, and the calibration particles are classified based on the morphological characteristics of the calibration particles contained in the standard particle suspension. That is, the morphological characteristics of the calibration particles are classified by the scattered light from the calibration particles contained in the standard particle suspension, and the classification performance of the evaluation target flow cytometer relating to the morphological characteristics is evaluated by the classification accuracy.

The Second Embodiment

In the following, the second embodiment of the present invention is described in detail with reference to the accompanying drawings. The standard particle suspension according to the present embodiment is referred to as a standard particle suspension La, and the calibration particles contained in the standard particle suspension are referred to as a particle 1a and a particle 2a.

Figure 5:
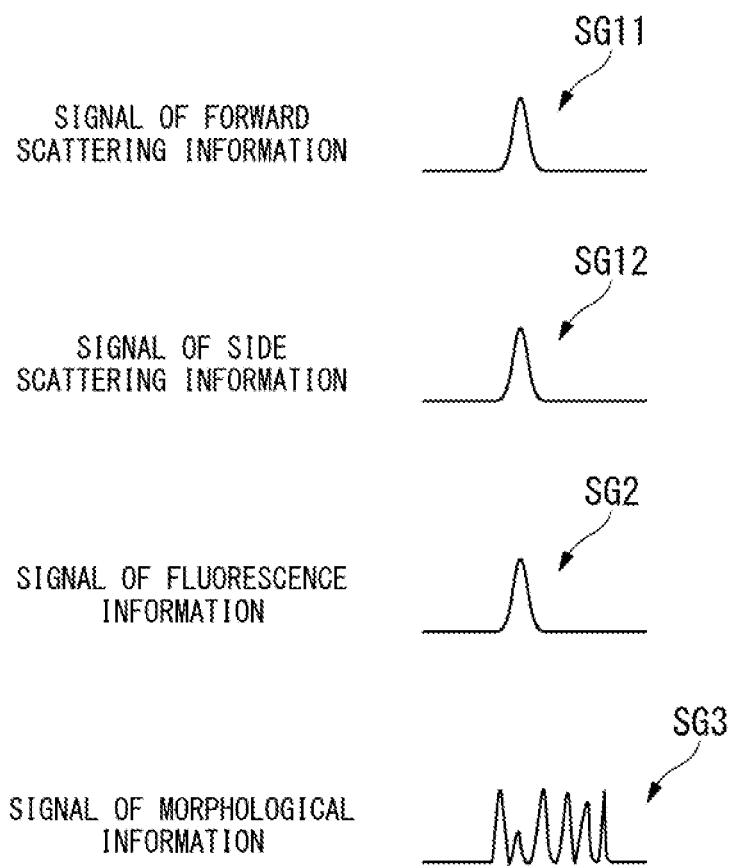
FIG. 5 is a diagram showing an example of signals obtained when the standard particle suspension according to the second embodiment of the present invention is measured by a flow cytometer.

FIG. 5 is a diagram showing an example of signals of the optical signal detected when the standard particle suspension La is measured in the evaluation target flow cytometer according to the present embodiment. In the evaluation target flow cytometer according to the present embodiment, in addition to the signal SG3 which is the optical signal for extracting the information on the morphologies of the calibration particles, the signal SG2 which is the signal of the fluorescence information measured at a spatial resolution lower than the spatial resolution at which the morphological characteristics can be classified by the signal SG3, and signal SG11 and signal SG12 as the signals of the scattering information are measured. It should be noted that the signal SG3 regarding the morphological information and the signal SG2 which is the signal of the fluorescence information, which are acquired in the evaluation target flow cytometer according to the present embodiment, are the same signals as the signals acquired by the evaluation target flow cytometer according to the first embodiment.

The signal SG11 is a signal of forward scattering information acquired as the total amount of the forward scattered light intensities that are measurable by the reference flow cytometer. The signal SG12 is a signal of the scattering information acquired as the total amount of the side scattered light intensities. In FIG. 5, as an example, the case in which the signal SG12 is a signal of the scattering information of the side scattered light is described, but the signal SG12 may be a signal of the scattering information of the back scattered light. In addition, the combination of the signal SG11 and the signal SG12 may be a combination of the signal of the side scattering information and the signal of the back scattering information. The signal SG11 and the signal SG12 are signals that are measurable even by the flow cytometer in the related art.

In the standard particle suspension La of the embodiment of the present invention, the signal SG3 is acquired based on the first optical characteristic of the contained particle 1a and particle 2a, the signal SG2 is acquired based on the second optical characteristic of the calibration particles, and the signals SG11 and SG12 are acquired based on the third optical characteristic of the calibration particles.

Figure 6:
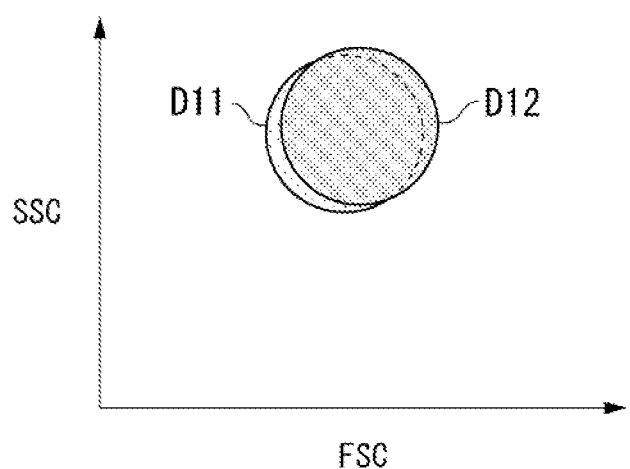
FIG. 6 is a diagram showing an example of a scatter plot regarding the intensities of forward scattered light and the intensities of side scattered light for calibration particles contained in the standard particle suspension according to the second embodiment of the present invention.

In the particle 1a and the particle 2a contained in the standard particle suspension La, the intensity of the forward scattered light and the intensity of the side scattered light are substantially the same among a plurality of calibration particles. FIG. 6 is a diagram showing an example of the scatter plot regarding the intensities of the forward scattered light and the intensities of the side scattered light for the particle 1a and the particle 2a according to the present embodiment. The region D11 and the region D12 show the combination of the intensities of the forward scattered light and the intensities of the side scattered light measured for the particle 1a and the particle 2a. Since the distribution of the region D11 and the distribution of the region D12 overlap considerably, it can be seen that the measured intensities of the forward scattered light and the measured intensities of the side scattered light, are substantially the same for the particle 1a and the particle 2a.

As described above, the particle 1a and the particle 2a have substantially the same scattering characteristics as each other. Therefore, the evaluation target flow cytometer cannot classify the particle 1 and the particle 2 based on the light scattering characteristics in dependence upon the total amount of the scattering intensities of the particles. On the other hand, it is the same as the first embodiment described above in that the particle 1a and the particle 2a have different morphologies from each other and have different fluorescence characteristics from each other. The fluorescence characteristic is an example of the second optical characteristic, and the particle 1a and the particle 2a can be classified by the total amount of the fluorescence intensities detected at a specific wavelength. Therefore, the classification result made by the evaluation target flow cytometer based on the morphological information is compared with the classification result obtained in advance by the reference flow cytometer based on the fluorescence characteristic, and for example, the degree of coincidence between the two classification results can be used as an index of the classification performance of the evaluation target flow cytometer.

The Third Embodiment

In the following, the third embodiment of the present invention will be described in detail with reference to the accompanying drawings. The standard particle suspension according to the present embodiment is referred to as a standard particle suspension Lb, and the calibration particles contained in the standard particle suspension are referred to as a particle 1b and a particle 2b.

It is different from the first and second embodiments described above in that the particle 1b and the particle 2b are stained with at least two types of fluorescence, and the first optical characteristic regarding the morphology of the calibration particles is obtained by measuring one type of fluorescence among the two types of fluorescence. That is, in the standard particle suspension Lb according to the embodiment of the present invention, the first optical characteristic and the second optical characteristic of the contained particle 1b and particle 2b are imparted by the two types of fluorescence staining that stains the particles.

The particle 1b and the particle 2b have substantially the same in the total amount of the intensities of the imparted first fluorescence. However, the particle 1b and the particle 2b are different in the fluorescence distribution because of the differences in morphology of the particles. The morphological differences of the calibration particles can be classified by the evaluation target flow cytometer having high spatial resolution using the differences in the fluorescence distribution based on the morphological differences of the particles as indices. However, it is difficult to classify the particle 1b and the particle 2b from each other using total amount of the intensities of the first fluorescence as an index by the reference flow cytometer having a lower spatial resolution than that of the evaluation target flow cytometer.

On the other hand, the particle 1b and the particle 2b are imparted with the different second fluorescence characteristics from each other for labeling to correctly classify these calibration particles. Therefore, it is the same as the first and second embodiments described above in that the mutual classification can be performed even by the reference flow cytometer having a lower spatial resolution when the second fluorescence characteristic is used. It should be noted that, as an example, the particle 1b and the particle 2b have substantially the same intensities of the scattered light to each other in the same manner as described above in the first and second embodiments.

As described above, the particle 1b and the particle 2b are stained with, for example, the same types of a first fluorescence as each other, and one of the particle 1b or the particle 2b are stained with a second fluorescence which is a different type from the first fluorescence. Here, the total amount of the fluorescence intensities of the first fluorescence is substantially the same for the particle 1b and the particle 2b.

Figure 7:
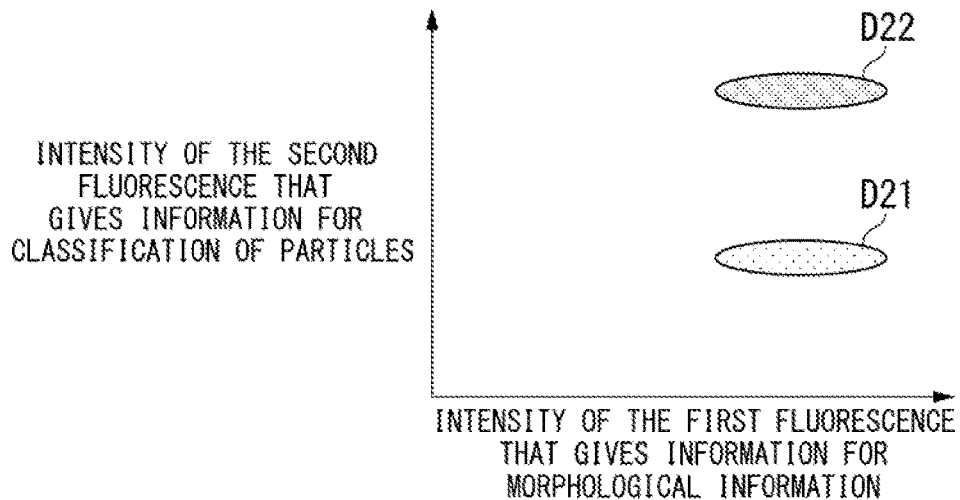
FIG. 7 is a scatter plot describing an example of two types of fluorescence characteristics imparted to calibration particles contained in the standard particle suspension according to the third embodiment of the present invention.

FIG. 7 is a diagram for further explaining the fluorescence characteristics imparted to the particle 1b and the particle 2b according to the present embodiment. It is a diagram showing an example of the results of measuring the fluorescence characteristics of the particle 1b and the particle 2b at a low resolution in the reference flow cytometer. FIG. 7 shows the distribution of the fluorescence intensities when the total amounts of the fluorescence intensities are measured for the first fluorescence and the second fluorescence at a spatial resolution lower than the spatial resolution at which the evaluation target flow cytometer classifies the calibration particles based on the first optical characteristic described above. A region D21 and a region D22 show the distribution of the total amounts of the first fluorescence and the second fluorescence measured for the particle 1b and the particle 2b, respectively. Although the particle 1b and the particle 2b are different in their morphologies, they have the same total amount of the first fluorescence for each other, so that the morphologies of the particles cannot be classified from the signals obtained from the information. As described above in the region D21 and the region D22, because the particle $1b$ and the particle $2b$ are further stained with the second fluorescence which is different from each other, it can be seen that they exhibit different fluorescence characteristics (total fluorescence amounts of the second fluorescence) from each other even when the measurement is performed at a low resolution in the reference flow cytometer.

As described above, it is difficult to distinguish the particle $1b$ and the particle $2b$ contained in the standard particle suspension Lb from each other by the total amounts of the fluorescence intensities of the first fluorescence of the calibration particles. But it is possible to classify the particle $1b$ and the particle $2b$ from each other based on the first optical characteristic using the first fluorescence intensity as an index when the evaluation target flow cytometer has a high spatial resolution that can classify the morphologies of the particles from each other based on the first optical characteristic. Since the calibration particles are imparted with the fluorescence characteristic of the second fluorescence by which the classification of the particles can be performed at a low resolution, the classification accuracy of the particles of the evaluation target flow cytometer by the first optical characteristic is assessed by the reference flow cytometer based on the fluorescence characteristic imparted by the second fluorescence.

The Fourth Embodiment

In the following, the fourth embodiment of the present invention will be described in detail with reference to the accompanying drawings. The standard particle suspension according to the present embodiment is referred to as a standard particle suspension Lc, and the calibration particles contained in the standard particle suspension are referred to as a particle $1c$ and a particle $2c$.

In the first to third embodiments described above, the examples have been described in which the calibration particles contained in the standard particle suspension Lc have different outer shapes from each other, but the present invention is not limited to this. The calibration particles contained in the standard particle suspension Lc may have substantially the same outer shape of the particles, and the internal structures of the particles may be different from each other. In this case, the evaluation target flow cytometer recognizes and classifies the differences in the internal structure of the calibration particles contained in the standard particle suspension Lc as the differences in the morphological information.

Figure 8:
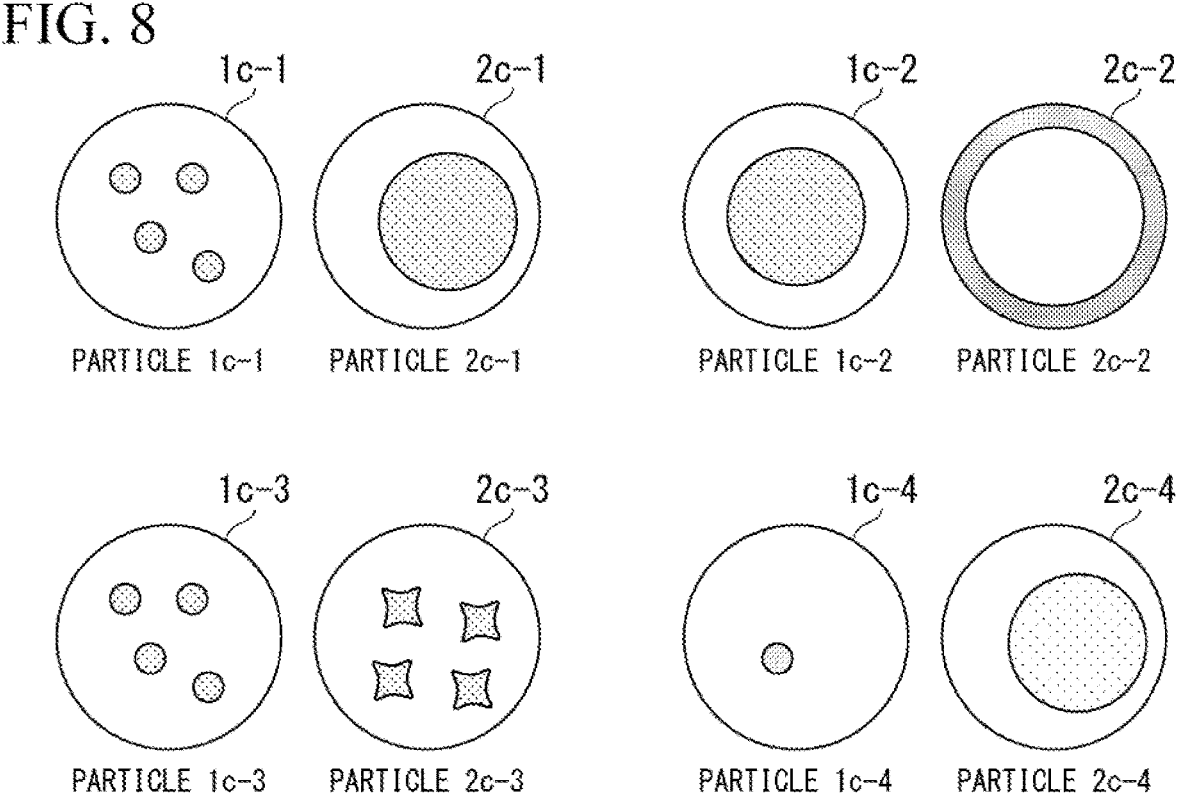
FIG. 8 is a diagram showing an example of the internal structure of calibration particles contained in the standard particle suspension according to the fourth embodiment of the present invention.

FIG. 8 is a diagram showing an example of different internal structures, which are different from each other, of the calibration particles contained in the standard particle suspension Lc according to the present embodiment. Each of a particle $1c$-1 to a particle $1c$-4 is an example of the particle $1c$, and each of a particle $2c$-1 to a particle $2c$-4 is an example of the particle $2c$. Both the particle $1c$ and the particle $2c$ have substantially spherical outer shapes. Both the particle $1c$ and the particle $2c$ contain internal particles. The particles contained inside each of the particle $1c$ and the particle $2c$ are stained with the fluorescence dye. (However, only in a case of the particle $2c$-2, the outer part of the internal particle of the particle $2c$-2 is stained).

In the following description, the particle contained inside each of the particle $1c$ and the particle $2c$ is referred to as an internal particle. In the present embodiment, the internal structure of the particle is, for example, the position, the distribution, the size, or the shape of the internal particles. The particle $1c$ and the particle $2c$ have different internal structures of the particles from each other and are imparted with the different fluorescence characteristics from each other for their distinction. It is the same as the first to third embodiments described above in that the fluorescence characteristic imparted to the particle $1c$ and the particle $2c$ is the second optical characteristic of the calibration particles and is used as an index for classifying the particle $1c$ and the particle $2c$ in the reference flow cytometer. In the same manner as the first to third embodiments described above, the classification result based on the morphological information by the evaluation target flow cytometer is compared with the classification result based on the fluorescence characteristic by the reference flow cytometer, and the classification performance of the evaluation target flow cytometer is evaluated.

The particle $1c$-1 contains a plurality of internal particles inside. On the other hand, the particle $2c$-1 contains one internal particle, which is larger than the internal particles contained in the particle $1c$-1.

The particle $1c$-2 contains one internal particle. The particle $2c$-2 also contains one internal particle, but the spherical shell-like part, which is positioned near the surface of the particle outside of the internal particle, is stained with fluorescence.

Both the particle $1c$-3 and the particle $2c$-3 contain a plurality of internal particles inside. In the particle $1c$-3, the shape of the internal particles is substantially spherical. On the other hand, in the particle $2c$-3, the shape of the internal particles is a shape having a convex portion.

The particle $1c$-4 contains one internal particle inside. The particle $2c$-4 also contains one internal particle, but the size of the internal particle is larger than that of particle $1c$-4.

The particle $1c$-1 and the particle $2c$-1, the particle $1c$-2 and the particle $2c$-2, the particle $1c$-3 and the particle $2c$-3, and the particle $1c$-4 and the particle $2c$-4 have different fluorescence characteristics from each other, and total amounts of fluorescence dyes contained in the particles are different from each other.

In the above, an example is described in which the differences in the fluorescence characteristic imparted to the particle $1c$ and the particle $2c$ are given by the differences in the amounts of fluorescence included. However, in addition to this, there is a case in which different fluorescence dyes are contained in the particle $1c$ and the particle $2c$, and the particle $1c$ and the particle $2c$ are distinguished by the imparted fluorescence wavelengths which are different from each other. In this case, the total amounts of the fluorescence dyes used for staining the internal particles of the particle $1c$ and the particle $2c$ may be substantially the same as each other.

The Fifth Embodiment

In the following, the fifth embodiment of the present invention will be described in detail with reference to the accompanying drawings.

In the first to fourth embodiments described above, the cases are described in which the standard particle suspension contains at least two types of calibration particles, and the standard particle suspension is used for evaluating the classification performance of the flow cytometer which is the evaluation target. In the present embodiment, a case is described in which the sizes of the internal particles contained in the calibration particles contained in the standard particle suspension are changed to particularly evaluate the resolution in the classification performance of the flow cytometer. Here, the resolution of the flow cytometer is performance regarding the spatial resolution of the image information acquired by the evaluation target flow cytometer, and how small size of the internal particles can be classified without deteriorating its classification performance by the flow cytometer which is the evaluation target is used as an index of the resolution of the flow cytometer.

The standard particle suspension according to the present embodiment is referred to as a standard particle suspension Ld, and the calibration particles contained in the standard particle suspension are referred to as a particle $1d$, a particle $2d$, a particle $3d$, a particle $4d$, a particle $5d$.

Figure 9:
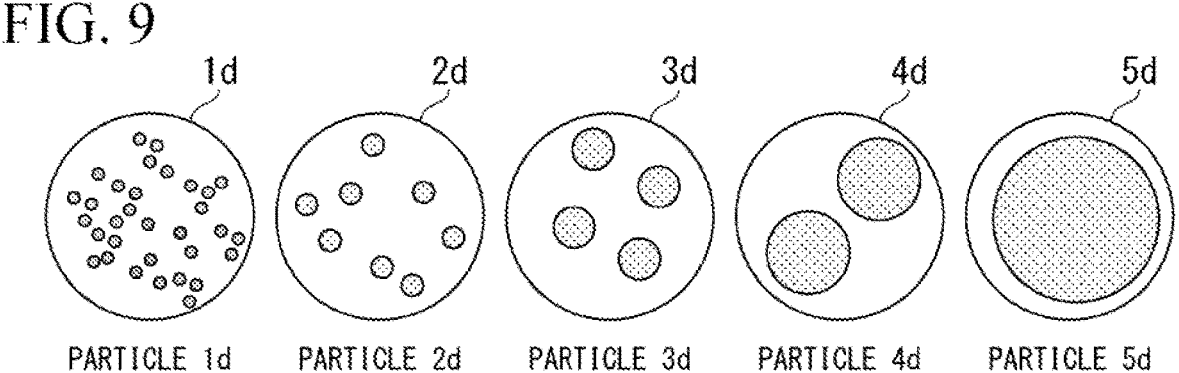
FIG. 9 is a diagram showing an example of the internal structure of calibration particles contained in the standard particle suspension according to the fifth embodiment of the present invention.

FIG. 9 is a diagram showing an example of the internal structure of the calibration particles contained in the standard particle suspension Ld according to the present embodiment. The particle $1d$ to the particle $5d$ contain internal particles of different sizes from each other. The size of the internal particles contained in each of the particle $1d$ to the particle $5d$ is larger in the order of the particle $1d$ to the particle $5d$. The number of internal particles contained in each of the particle $1d$ to the particle $5d$ is smaller in the order of the particle $1d$ to the particle $5d$. The total volume of the internal particles contained in each of the particle $1d$ to the particle $5d$ is substantially the same between the particle $1d$ and the particle $5d$.

In the example shown in FIG. 9, the particle $5d$ contains one internal particle, whereas the particle $4d$ contains two internal particles, and the size of the internal particles contained in each of the particle $3d$, the particle $2d$, and the particle $1d$ is decreased and the number thereof is increased.

Since the morphological information can be acquired at a high spatial resolution in the flow cytometer that performs the measurement based on the ghost cytometry technique, the calibration particles contained in the standard particle suspension Ld can be classified based on the above described differences in the internal structure of the particles contained in the standard particle suspension Ld according to the present embodiment. Setting a flow cytometer having a high spatial resolution, such as a flow cytometer based on the ghost cytometry technique, as an evaluation target flow cytometer, the standard particle suspension Ld according to the present embodiment is used for evaluating the resolution of the flow cytometer. The optical characteristic derived from the internal structure of the calibration particles detected by the evaluation target flow cytometer is the first optical characteristic. The first optical characteristic detected by the evaluation target flow cytometer is the same as that in the first to fourth embodiments described above.

Figure 10:
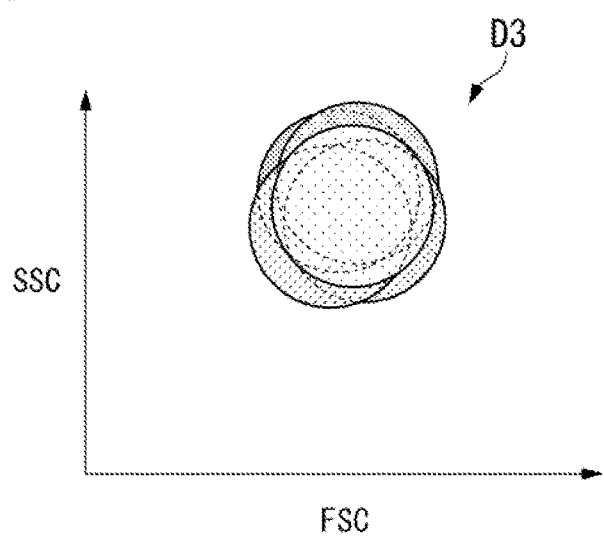
FIG. 10 is a diagram showing an example of a scatter plot regarding the intensities of forward scattered light and the intensities of side scattered light for calibration particles contained in the standard particle suspension according to the fifth embodiment of the present invention.

The particle $1d$ to the particle $5d$ show substantially the same light scattering characteristics as each other, and the acquired scattering information is substantially the same. FIG. 10 is a diagram showing an example of the scatter plot regarding the intensities of the forward scattered light and the intensities of the side scattered light for the particle $1d$ to the particle $5d$ according to the present embodiment. The region D3 is a plurality of regions in which the intensities of the forward scattered light and the intensities of the side scattered light are shown for each of the particle $1d$ to the particle $5d$ with respect to the intensities of the scattered light measured for the particle $1d$ to the particle $5d$. From the region D3, it can be seen that the measured intensities of the forward scattered light and the side scattered light are substantially the same for the particle $1d$ to the particle $5d$. In FIG. 10, the case in which the forward scattered lights and the side scattered lights of the particle $1d$ to the particle $5d$ are substantially the same as each other is described as an example, but the case in which as the scattered light the back scattered lights are substantially the same is also acceptable. In the example of the standard particle suspension Ld according to the present embodiment, the intensity of scattered light is the third optical characteristic of the calibration particles. Since the total amounts of the intensities of the scattered light of the calibration particles contained in the standard particle suspension Ld are substantially the same, it is difficult to perform classification based on the total amounts of the intensities of the scattered light using the flow cytometer in the related art.

Figure 11:
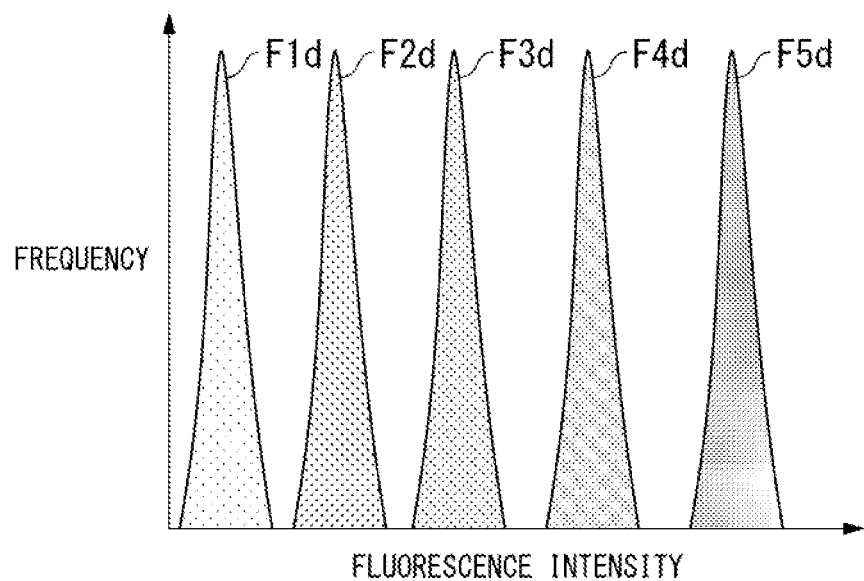
FIG. 11 is a diagram showing an example of fluorescence characteristics of the calibration particles contained in the standard particle suspension according to the fifth embodiment of the present invention.

FIG. 11 shows an example of the fluorescence characteristics of the particle $1d$ to the particle $5d$. Each of a graph F$1d$, a graph F$2d$, a graph F$3d$, a graph F$4d$, and a graph F$5d$ is a graph showing a relationship between the intensities of the fluorescence and the frequency measured for each of the particle $1d$, the particle $2d$, the particle $3d$, the particle $4d$, and the particle $5d$. As shown in FIG. 11, the particle $1d$ to the particle $5d$ have different fluorescence characteristics from each other, and in a case of FIG. 11, the intensities of the emitted fluorescence are different from each other. In the example of the standard particle suspension Ld according to the present embodiment, the intensity of fluorescence is the second optical characteristic of the calibration particles. The particle $1d$ to the particle $5d$ can be classified by the reference flow cytometer based on the second optical characteristic. The classification result based on the morphological information by the evaluation target flow cytometer is compared with the classification result based on the fluorescence characteristic by the reference flow cytometer, and the resolution of the evaluation target flow cytometer is evaluated.

Figure 12:
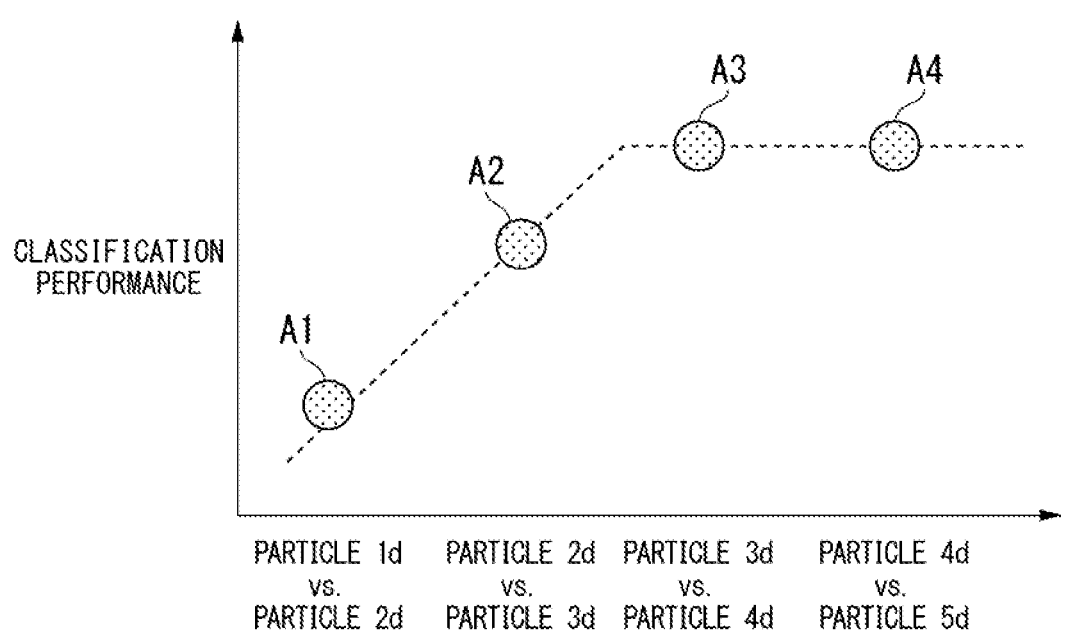
FIG. 12 is a diagram showing an example of classification performance of a flow cytometer in the case in which the sizes of internal particles included in the calibration particles contained in the standard particle suspension according to the fifth embodiment of the present invention are different.

FIG. 12 is a diagram showing an example in which the resolution of the evaluation target flow cytometer is evaluated by combining and measuring the standard particle suspension Ld in which the size of the internal particles according to the present embodiment is changed. A plot A1 shows the classification performance of the evaluation target flow cytometer in a case in which the standard particle suspension Ld contains the particle $1d$ and the particle $2d$. Here, the classification performance is an index indicating the degree of coincidence between the classification result performed by the evaluation target flow cytometer in which classification of the particle $1d$ and the particle $2d$ are made based on the differences in the size of the internal particles using the first fluorescence intensity as an index and the classification result performed by the reference flow cytometer based on the second optical characteristic for verification. A plot A2 shows the classification performance of the flow cytometer in a case in which the standard particle suspension Ld contains the particle $2d$ and the particle $3d$. A plot A3 shows the classification performance of the flow cytometer in a case in which the standard particle suspension Ld contains the particle $3d$ and the particle $4d$. A plot A4 shows the classification performance of the flow cytometer in a case in which the standard particle suspension Ld contains the particle $4d$ and the particle $5d$.

In the example shown in FIG. 12, as shown by the plot A4 and the plot A3, the classification performance is high and maintained constant as long as the size of the internal particles is large. On the other hand, as shown by the plot A2 and the plot A1, the classification performance is deteriorated as the size of the internal particles is decreased. In the present embodiment, when the size of the internal particles contained in the calibration particles contained in the standard particle suspension Ld is reduced, for example, the size of the internal particles immediately before the classification performance is deteriorated is assessed as the resolution of the flow cytometer. The resolution of the flow cytometer is the performance regarding the spatial resolution of the image information acquired by the evaluation target flow cytometer.

The Sixth Embodiment

In the following, the sixth embodiment of the present invention will be described in detail with reference to the accompanying drawings.

The standard particle suspension according to the present embodiment is referred to as a standard particle suspension Le, and the calibration particles contained in the standard particle suspension are referred to as a particle $1e$, a particle $2e$, a particle $3e$, a particle $4e$, a particle $5e$.

Figure 13:
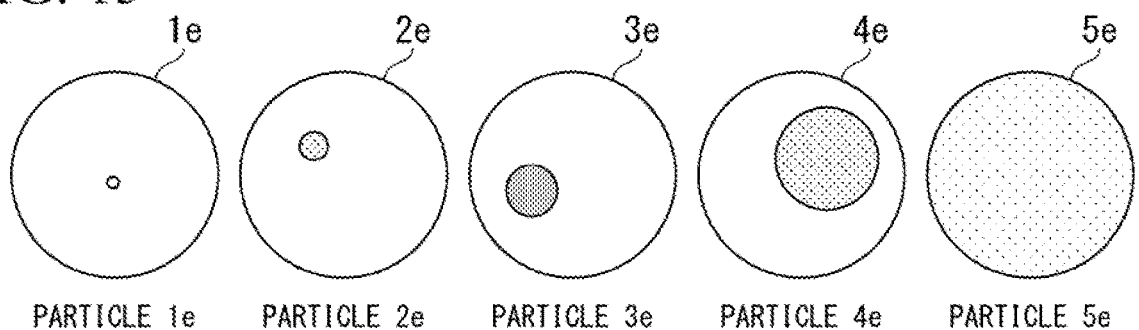
FIG. 13 is a diagram showing an example of the internal structure of calibration particles contained in the standard particle suspension according to the sixth embodiment of the present invention.

FIG. 13 is a diagram showing an example of the internal structure of the calibration particles contained in the standard particle suspension Le according to the present embodiment. Each of the particle $1e$ to the particle $5e$ contains an internal particle. The size of the internal particle contained in each of the particle $1e$ to the particle $5e$ is larger in the order of the particle $1e$ to the particle $5e$. The number of internal particles contained in each of the particle $1e$ to the particle $5e$ is the same, and it is one as an example in the present embodiment. The amounts of the fluorescence dyes used for staining the internal particles contained in the particle $1e$ to the particle $5e$ are substantially the same as each other, thus the fluorescence intensities are substantially the same as each other. The density of the fluorescence dye of the internal particle is higher in the order of the particle $1e$, the particle $2e$, the particle $3e$, the particle $4e$, and the particle $5e$. It should be noted that the wavelengths of the fluorescence emitted from the particle $1e$ to the particle $5e$ are different from each other. In the example of the standard particle suspension Le according to the present embodiment, the attribution that the fluorescence wavelengths emitted by the fluorescence dyes contained in the calibration particles are different is the second optical characteristic of the particles, and the particles from the particle $1e$ to the particle $5e$ can be classified by the reference flow cytometer based on the second optical characteristic.

It should be noted that, in the example of the standard particle suspension Le according to the present embodiment, the optical characteristic derived from the internal structure of the calibration particles is the first optical characteristic of the particles, and it is the same signal as the signals acquired by the evaluation target flow cytometers in the first to fifth embodiments. The evaluation target flow cytometer classifies the particles contained in the standard particle suspension Le based on the first optical characteristic. In the present embodiment, as is the case in the fifth embodiment described above, for example, when the size of the internal particle contained in the particles contained in the standard particle suspension Le is reduced, the size of the internal particle immediately before the classification performance is deteriorated can be assessed as the resolution of the flow cytometer.

The Seventh Embodiment

In the following, the seventh embodiment of the present invention will be described in detail with reference to the accompanying drawings.

The standard particle suspension according to the present embodiment is referred to as a standard particle suspension Lf, and the calibration particles contained in the standard particle suspension are referred to as a particle $1f$, a particle $2f$, a particle $3f$, a particle $4f$, a particle $5f$.

In the particles $1f$ to $5f$, a plurality of fluorescence dyes are used for staining the internal particles. The particles $1f$ to $5f$ have the same total amount of the first fluorescence contained therein, and have the fluorescence intensities which are substantially the same as each other. Therefore, even when the particles $1f$ to $5f$ are measured in the reference flow cytometer at a low resolution using the total amount of the fluorescence intensities of the commonly contained first fluorescence as an index, it is difficult to distinguish the particles $1f$ to $5f$ as different calibration particles.

On the other hand, the particles $1f$ to $5f$ are stained with the second fluorescence, which is a different type from the first fluorescence. As an example, the second fluorescence dyes contained in the particles $1f$ to $5f$ have different total amounts of fluorescence contained therein, and even when the particles $1f$ to $5f$ are measured in the reference flow cytometer at a low resolution using the fluorescence intensity of the second fluorescence as an index, it is possible to classify the particles $1f$ to $5f$ from each other. That is, in the standard particle suspension Lf according to the present embodiment, as is the case in the third embodiment, the first optical characteristic and the second optical characteristic of the particles $1f$ to $5f$ contained in the calibration particles contained in the standard particle suspension are imparted by two types of fluorescence dyes that stain the particles.

Figure 14:
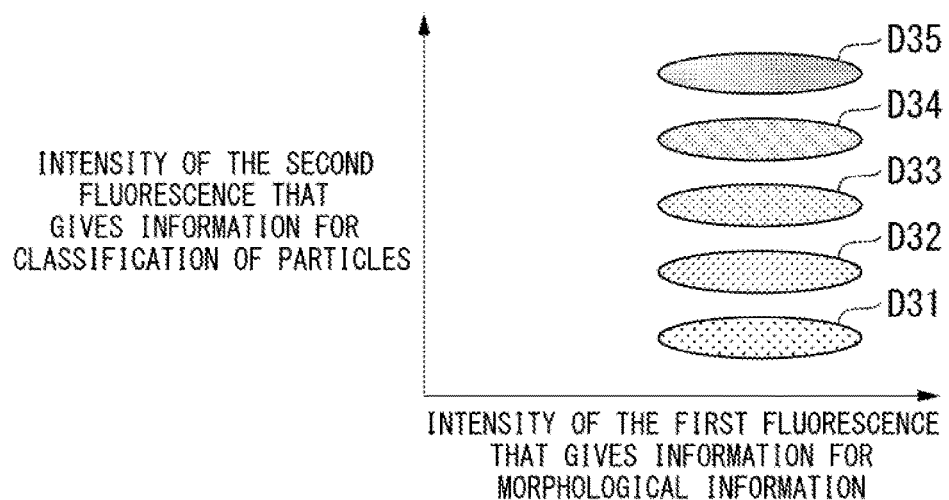
FIG. 14 is a scatter plot describing an example of two types of fluorescence characteristics imparted to calibration particles contained in the standard particle suspension according to the seventh embodiment of the present invention.

FIG. 14 is a diagram showing the results of measuring the fluorescence characteristics imparted to the particles $1f$ to $5f$ using the reference flow cytometer at a low resolution as an example in the present embodiment. FIG. 14 shows the distribution of the fluorescence intensities when the first fluorescence and the second fluorescence are measured at a spatial resolution lower than the spatial resolution that is required for making the classification possible by the first optical characteristic described above. Each of a region D31, a region D32, a region D33, a region D34, and a region D35 indicates a combination of the intensity distributions of the first fluorescence and the second fluorescence measured for the particle $1f$, the particle $2f$, the particle $3f$, the particle $4f$, and the particle $5f$. The particle $1f$, the particle $2f$, the particle $3f$, the particle $4f$, and the particle $5f$ are calibration particles having different morphologies from each other, but as shown in FIG. 14, the total amount of the first fluorescence that can be detected is equal to each other, so that even when the measurement is performed at a low spatial resolution by the reference flow cytometer, the particles contained in the standard particle suspension Lf cannot be classified from each other.

On the other hand, in the flow cytometer based on the ghost cytometry technique, unlike the flow cytometer in the related art in which the evaluation is performed by the total amount of the fluorescence, it is possible to acquire the morphological information of the measurement targets with a high spatial resolution based on the detected first fluorescence signal. The flow cytometer based on the ghost cytometry technique can classify the measurement targets based on the differences in the morphology or the internal structure of the calibration particles based on the morphological information. In a case in which the classification performance of the flow cytometer using the ghost cytometry technique is evaluated using the standard particle suspension Lf, the optical characteristic of the time-series waveforms of the optical signals derived from the detected first fluorescence is the first optical characteristic. Based on the optical signal information reflecting the differences in morphology of the discriminated particle $1f$, particle $2f$, particle $3f$, particle $4f$, and particle 5*f*, the calibration particles contained in the standard particle suspension Lf can be classified from each other. On the other hand, as can be seen from the region D31 to the region D35 shown in FIG. 14, the particles 1*f* to 5*f* can be classified from each other by the different second fluorescence characteristics from each other as described above. In the example of the present embodiment, the second fluorescence of the calibration particles corresponds to the second optical characteristic. Therefore, the classification accuracy of the calibration particles by the evaluation target flow cytometer based on the first optical characteristic can be verified by the fluorescence characteristic derived from the second fluorescence measurable at a lower spatial resolution.

In the present embodiment, the example is described in which the fluorescence characteristic derived from the second fluorescence measurable at a lower spatial resolution is imparted by the differences in the fluorescence intensities, but the fluorescence having different wavelengths from each other may be imparted to the particles 1*f* to 5*f* as the second fluorescence.

(Summary of Each Embodiment)

As described above, the standard particle suspensions L, La, Lb, Lc, Ld, Le, and Lf according to the embodiments described above contain two or more types of calibration particles (in the embodiment described above, the particles 1, 1*a*, 1*b*, 1*c*, 1*d*, 1*e*, and 1*f*, the particles 2, 2*a*, 2*b*, 2*c*, 2*d*, 2*e*, and 2*f*, the particles 3*d*, 3*e*, and 3*f*, the particles 4*d*, 4*e*, and 4*f*, and the particles 5*d*, 5*e*, and 5*f*) in which the first optical characteristics (optical characteristics of the lights reflecting the morphological characteristics in the embodiment described above) are different from each other, and the second optical characteristics (fluorescence characteristics in the embodiment described above) that can be classified at a spatial resolution lower than the spatial resolution at which the first optical characteristic (optical characteristics of light reflecting the morphological characteristics in the embodiment described above) can be classified are different from each other.

With this configuration, in the standard particle suspensions L, La, Lb, Lc, Ld, Le, and Lf according to the embodiments described above, the performance to classify the particles of the evaluation target flow cytometer can be evaluated based on the degree of coincidence between the classification result based on the first optical characteristics (optical characteristics of lights reflecting the morphological characteristics in the embodiment described above) and the classification result based on the second optical characteristics (fluorescence characteristics in the embodiment described above). Here, the second optical characteristics which are different from each other can be classified at a spatial resolution lower than the spatial resolution at which the first optical characteristic (optical characteristics of light reflecting the morphological characteristics in the embodiment described above) can be classified, so that the performance to classify the differences in the morphology of the flow cytometer can be easily and objectively evaluated.

In addition, in the standard particle suspensions L, La, Lb, Lc, Ld, Le, and Lf according to the embodiments described above, the two or more types of calibration particles (in the embodiment described above, the particles 1, 1*a*, 1*b*, 1*c*, 1*d*, 1*e*, and 1*f*, the particles 2, 2*a*, 2*b*, 2*c*, 2*d*, 2*e*, and 2*f*, the particles 3*d*, 3*e*, and 3*f*, the particles 4*d*, 4*e*, and 4*f*, and the particles 5*d*, 5*e*, and 5*f*) may further contain the third optical characteristics (scattered light intensity in the embodiment described above) that are substantially the same as each other.

With this configuration, in the standard particle suspensions L, La, Lb, Lc, Ld, Le, and Lf according to the embodiments described above, the evaluation target flow cytometer cannot classify the calibration particles based on the third optical characteristic (scattered light intensity in the embodiment described above). Therefore, when the two or more types of calibration particles (in the embodiment described above, the particles 1, 1*a*, 1*b*, 1*c*, 1*d*, 1*e*, and 1*f*, the particles 2, 2*a*, 2*b*, 2*c*, 2*d*, 2*e*, and 2*f*, the particles 3*d*, 3*e*, and 3*f*, the particles 4*d*, 4*e*, and 4*f*, and the particles 5*d*, 5*e*, and 5*f*) are classified by the evaluation target flow cytometer, it can be certainly evaluated whether or not the classification can be performed, not based on the third optical characteristic (scattered light intensities in the embodiment described above) that is classifiable from each other by the flow cytometer in the related art having a low spatial resolution, but based on the first optical characteristic (optical characteristics of lights reflecting the morphological characteristics in the embodiment described above) that is not classifiable from each other by the flow cytometer in the related art.

In addition, in the standard particle suspensions L, La, Lb, Lc, Ld, Le, and Lf according to the embodiments described above, the third optical characteristic is the total amount of the intensities of the scattered light emitted from the particles in response to the light irradiated to the calibration particles (in the embodiment described above, the particles 1, 1*a*, 1*b*, 1*c*, 1*d*, 1*e*, and 1*f*, the particles 2, 2*a*, 2*b*, 2*c*, 2*d*, 2*e*, and 2*f*, the particles 3*d*, 3*e*, and 3*f*, the particles 4*d*, 4*e*, and 4*f*, and the particles 5*d*, 5*e*, and 5*f*.

With this configuration, in the standard particle suspensions L, La, Lb, Lc, Ld, Le, and Lf according to the embodiments described above, since the calibration particles cannot be classified based on the total amount of the scattered light intensities, when the two or more types of calibration particles (in the embodiment described above, the particles 1, 1*a*, 1*b*, 1*c*, 1*d*, 1*e*, and 1*f*, the particles 2, 2*a*, 2*b*, 2*c*, 2*d*, 2*e*, and 2*f*, the particles 3*d*, 3*e*, and 3*f*, the particles 4*d*, 4*e*, and 4*f*, and the particles 5*d*, 5*e*, and 5*f*) are classified by the evaluation target flow cytometer, it can be certainly evaluated whether or not the classification can be performed, not based on the scattered light intensities different from each other that are classifiable by the flow cytometer in the related art having a low spatial resolution, but based on the first optical characteristic (optical characteristics of lights reflecting the morphological characteristics in the embodiment described above).

In addition, in the standard particle suspensions L, La, Lb, Lc, Ld, Le, and Lf according to the embodiments described above, the first optical characteristic is the optical characteristic derived from the differences in the morphology that can be classified at a higher spatial resolution for the calibration particles (in the embodiment described above, the particles 1, 1*a*, 1*b*, 1*c*, 1*d*, 1*e*, and 1*f*, the particles 2, 2*a*, 2*b*, 2*c*, 2*d*, 2*e*, and 2*f*, the particles 3*d*, 3*e*, and 3*f*, the particles 4*d*, 4*e*, and 4*f*, and the particles 5*d*, 5*e*, and 5*f*). Examples of the optical characteristic derived from the morphologies that can be classified at a higher spatial resolution include the optical signal information obtained based on the ghost cytometry technique, and the information on the measurement particles is directly acquired from the time-series optical signal information, such as the scattered light, the interference light, the diffracted light, and the fluorescence, detected when the sample is irradiated with the structured illumination. Similarly, the standard particle suspensions L, La, Lb, Lc, Ld, Le, and Lf according to the present embodiment can use the technique of directly extracting the morphological information of the calibration particles from the information detected by the irradiation the sample without the conversion into the image information.

With this configuration, in the standard particle suspensions L, La, Lb, Lc, Ld, Le, and Lf according to the embodiments described above, the performance of the evaluation target flow cytometer to classify the morphologies can be evaluated based on the degree of coincidence between the classification result based on the morphology of the calibration particles of the evaluation target flow cytometer and the classification result based on the second optical characteristics (fluorescence characteristic in the embodiment described above). Here, the second optical characteristics which are different from each other, can be classified at a spatial resolution lower than the spatial resolution at which the differences in the morphology of the particles can be classified, so that the performance to classify the differences in the morphology of the evaluation target flow cytometer can be easily evaluated.

In addition, in the standard particle suspensions L, La, Lb, Lc, Ld, Le, and Lf according to the embodiments described above, the second optical characteristic is one or both of the wavelength and the intensity of the fluorescence (fluorescence characteristic) emitted from the calibration particles (in the embodiment described above, the particles $1$, $1a$, $1b$, $1c$, $1d$, $1e$, and $1f$, the particles $2$, $2a$, $2b$, $2c$, $2d$, $2e$, and $2f$, the particles $3d$, $3e$, and $3f$, the particles $4d$, $4e$, and $4f$, and the particles $5d$, $5e$, and $5f$) in response to the irradiated light.

With this configuration, in the standard particle suspensions L, La, Lb, Lc, Ld, Le, and Lf according to the embodiments described above, the performance of the evaluation target flow cytometer to classify the morphologies can be evaluated based on the degree of coincidence between the classification result based on the first optical characteristic (morphological information that is measurable at a higher spatial resolution in the embodiment described above) of the evaluation target flow cytometer and the classification result based on the fluorescence characteristic (different fluorescence characteristics from each other imparted to the calibration particles having the different morphological characteristics from each other) that is classifiable at a lower spatial resolution than the spatial resolution of the first optical characteristic described above, so that the classification performance of the evaluation target flow cytometer based on the first optical characteristic described above can be easily and objectively evaluated.

EXAMPLES

Hereinafter, Example according to each of the embodiments described above is described.

[Preparation Method of Beads]

Figure 15:
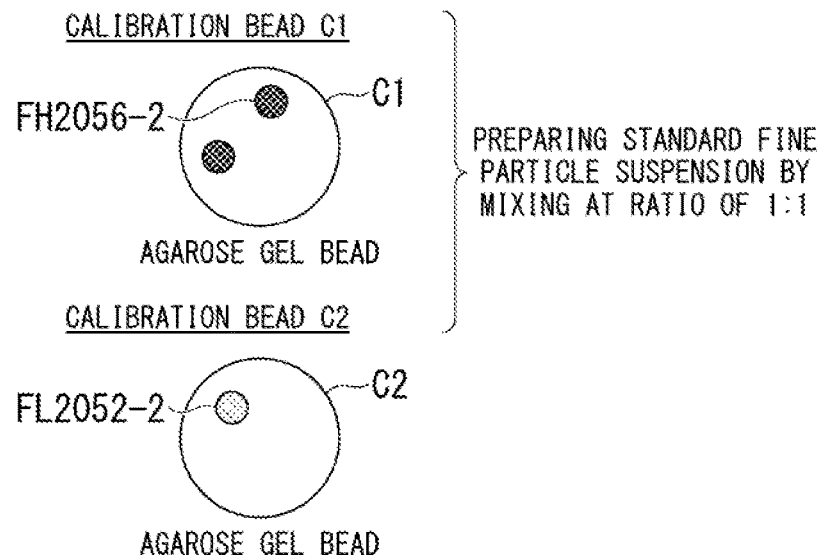
FIG. 15 is a diagram showing the structure of calibration beads according to Examples of the present invention.

FIG. 15 is a diagram showing an example of the structure of calibration beads according to Example. In Example, as an example of the calibration beads contained in the standard particle suspension L in the embodiments described above, a calibration bead C1 and a calibration bead C2 having their characteristics in form by incorporating a certain number of fluorescence polystyrene beads into an agarose gel bead are used. The calibration bead C1 contains two particles in a particle. The calibration bead C2 contains one particle in a particle. The preparation method of the calibration beads is described below.

Commercially available materials can be used for the agarose used for preparing the agarose gel beads. In the calibration bead C1 and the calibration bead C2 used for the following measurement, Agarose Ultra-low Gelling Temperature manufactured by Sigma-Aldrich was used. In Example, the following two types of fluorescence polystyrene bead-containing solutions manufactured by Spherotech Inc. were used as the fluorescence polystyrene beads incorporated into the agarose gel beads. The first type of fluorescence polystyrene beads were "SPHEROTM Fluorescent Particles FH2056-2 (High-Intensity, Φ2 μm, Nilered)". The second type of fluorescence polystyrene beads were "SPHEROTM Fluorescent Particles FL2052-2 (Low-Intensity, ψ2 μm, Yellow)". It should be noted that the particles incorporated into the agarose gel beads can be substituted with other materials. In Example, two types of calibration beads having different morphologies were prepared by incorporating different numbers of different fluorescence polystyrene beads into the agarose gel beads.

The agarose gel beads for calibration were created by generating water-in-oil (W/O)-type droplets with a flow-focusing microfluidic device. More specifically, while sending an agarose mixture containing a surfactant and the fluorescence polystyrene beads with a syringe pump, the agarose mixture and carrier oil containing the surfactant (in Example, Droplet Generator manufactured by Bio-Rad Laboratories, Inc. was used) were mixed at the branch portion of a microchannel. As a result, the agarose mixture sheared the carrier oil, and spherical droplets were generated in the carrier oil by surface tension. The creation technique of water-in-oil droplets preparation by such a microchannel technique is described in, for example, "Dynamics of Microfluidic droplets (C. N. Baroud, et al., Lab Chip, (2010) 10, 2032-2045)".

The agarose gel beads generated by the method described above were used as the calibration beads of the flow cytometer based on the ghost cytometry technique after washing and confirming the bead characteristics. Confirmation of bead characteristics is confirmation of the number of fluorescence beads contained in an agarose gel bead, an abundance ratio of leaky beads or doublet particles, and the like. It should be noted that, in the measurement examples described below, one measurement example for the two types of calibration beads of the calibration bead C1 and the calibration bead C2 shown in FIG. 15 and another measurement example for the standard particle suspension prepared such that the calibration bead C1 and the calibration bead C2 are contained in a ratio of 1:1 are described. It should be noted that an average particle size of the agarose gel beads contained in the prepared standard particle suspension was about 20 μm as a result of measurement with an electron biomicroscope (EVOS manufactured by Thermo Fisher Scientific Inc.) before washing.

[Measurement Example of Standard Particle Suspension by a Flow Cytometer Based On Ghost Cytometry Technique]

In Example, as an example, a result is described in which the standard particle suspension prepared by mixing the calibration bead C1 and the calibration bead C2 prepared by the method described above at a ratio of 1:1 was classified using the fluorescence signal waveform acquired based on the ghost cytometry technique. In Example, the flow cytometer based on the ghost cytometry technique described in Non-Patent Document 1 (hereinafter referred to as flow cytometer FCM1) was used. In the flow cytometer FCM1, the illumination light by the laser light having a wavelength of 488 nm was structured, observation targets that pass the flow channel were irradiated with the structured illumination light, and morphological differences in the measurement targets were classified based on the time-series signal waveforms acquired by detecting the fluorescence emitted from the observation targets. On the other hand, in the flow cytometer FCM1, in addition to the measurement based on the ghost cytometry technique, the measurement made by the flow cytometer in the related art can also be performed in which the laser light having a wavelength of 637 nm is irradiated as a spot light and measures the total amount of the scattered light intensities or the fluorescence intensities from the observation targets is measured. In addition, in the flow cytometer FCM1, the total amount of the time-series fluorescence signal waveforms (integrated value of fluorescence intensity) detected by the structured illumination can be obtained as the same information as the total amount of the fluorescence intensities measured by the irradiation of the spot light.

In the present embodiment, the flow cytometer FCM1 detected the fluorescence signal waveform based on the ghost cytometry technique described above at a wavelength of 525 nm. In addition, for the incorporated calibration beads, the detection of the total amount of the fluorescence intensities using the spot light (detection wavelength 676 nm) and the detection of the total amount of the scattered light (FSC) intensities were performed on different independent channels.

[Measurement Example of Calibration Bead C1 and Calibration Bead C2 by Flow Cytometer FCM1 and Measurement Example of Standard Particle Suspension containing the Calibration Bead C1 and the Calibration Bead C2 at 1:1]

Figure 16:
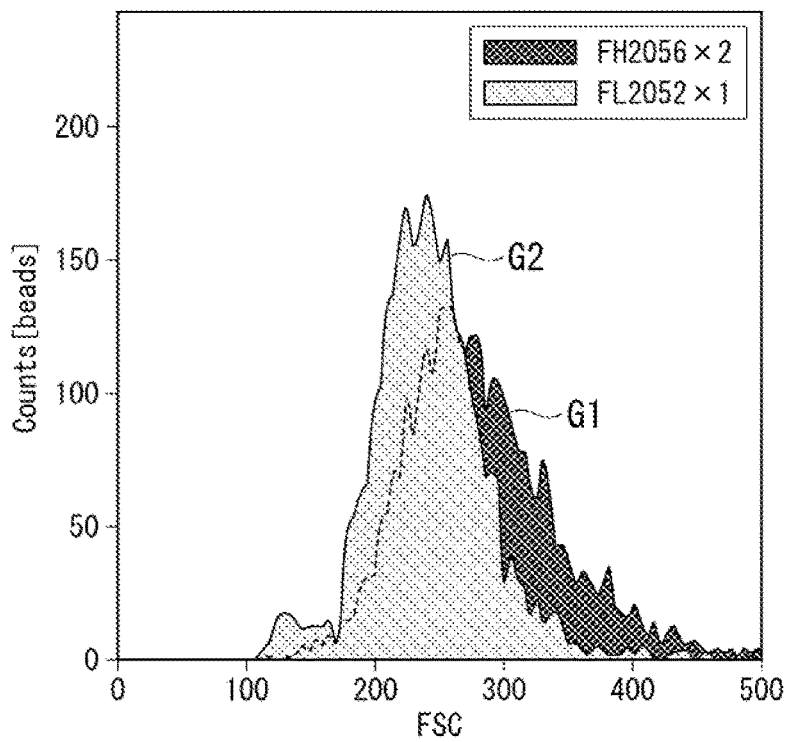
FIG. 16 is a diagram showing the measurement results of the scattering characteristics of two types of calibration beads contained in the standard particle suspension using a spot light (wavelength 637 nm) by a flow cytometer according to Examples of the present invention.

FIG. 16 shows a result of measuring each of the scattering characteristics of the calibration bead C1 and the calibration bead C2 contained in the standard particle suspension using a spot light (wavelength 637 nm) by the flow cytometer FCM1. A graph G1 shows the result of measuring the scattering characteristic of the calibration bead C1. A graph G2 shows the result of measuring the scattering characteristic of the calibration bead C2. It was suggested that the calibration bead C1 and the calibration bead C2 had overlapping distributions of forward scattering (FSC) intensities, and it was difficult to classify the calibration bead C1 and the calibration bead C2 using the total amount of the FSC intensities as an index.

Figure 17:
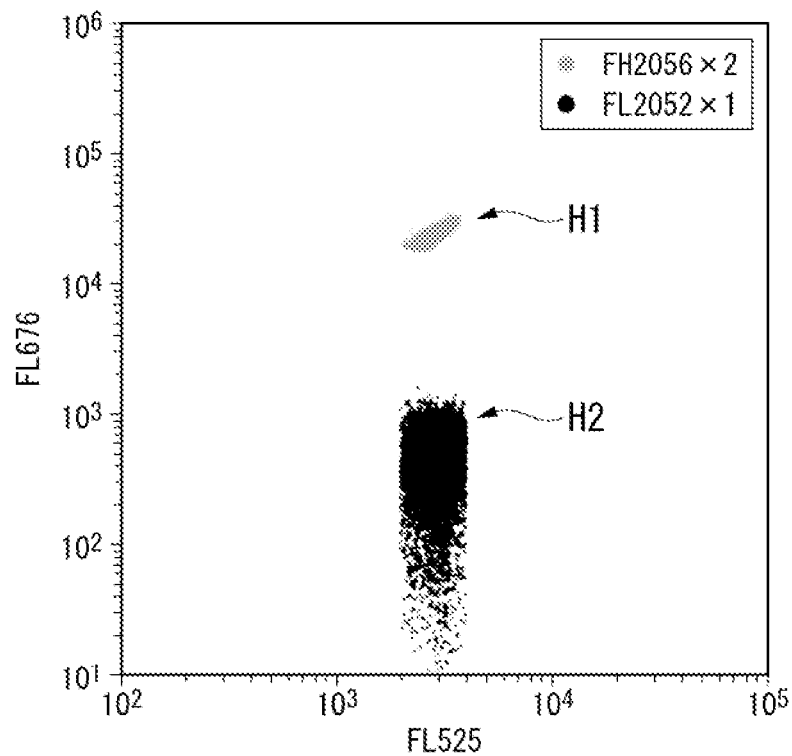
FIG. 17 is a diagram showing the measurement results of the total amount of fluorescence intensities using structured illumination at a wavelength of 525 nm, and the measurement results of the total amount of fluorescence intensities using a spot light at a detection wavelength of 676 nm in a flow cytometer according to Examples of the present invention.

FIG. 17 shows the results of the measurements of the calibration bead C1 and the calibration bead C2 made in the flow cytometer FCM1, in which the measurements were made by the total amount of the fluorescence intensities using the structured illumination at a wavelength of 525 nm and the total amount of the fluorescence intensities using the spot light at a detection wavelength of 676 nm. The wavelength of 525 nm is a wavelength used in the flow cytometer FCM1 for detecting the fluorescence signal based on the ghost cytometry technique. Data H1 shows the measurement results by the total amount of the fluorescence intensities of the calibration bead C1. Data H2 shows the measurement results by the total amount of the fluorescence intensities of the calibration bead C2.

In the detection at the detection wavelength of 676 nm, the differences in the fluorescence intensity between the calibration bead C1 and the calibration bead C2 were detected. The detected differences in the fluorescence intensity were caused by the fact that each calibration bead contains a different fluorescence dye. In the flow cytometer FCM1, machine learning was performed by imparting a correct label to the training data based on the different fluorescence characteristics of the calibration beads.

On the other hand, in the detection at the detection wavelength of 525 nm, the calibration bead C1 and the calibration bead C2 showed substantially the same fluorescence intensity in terms of the total amount of the fluorescence. The fact that substantially the same fluorescence intensity was shown for the two types of calibration beads in terms of the total amount of fluorescence suggests that the two types of calibration beads contained in the standard particle suspension were difficult to be classified using the "total amount of the fluorescence intensities" detected at a wavelength of 525 nm as an index.

Figure 18:
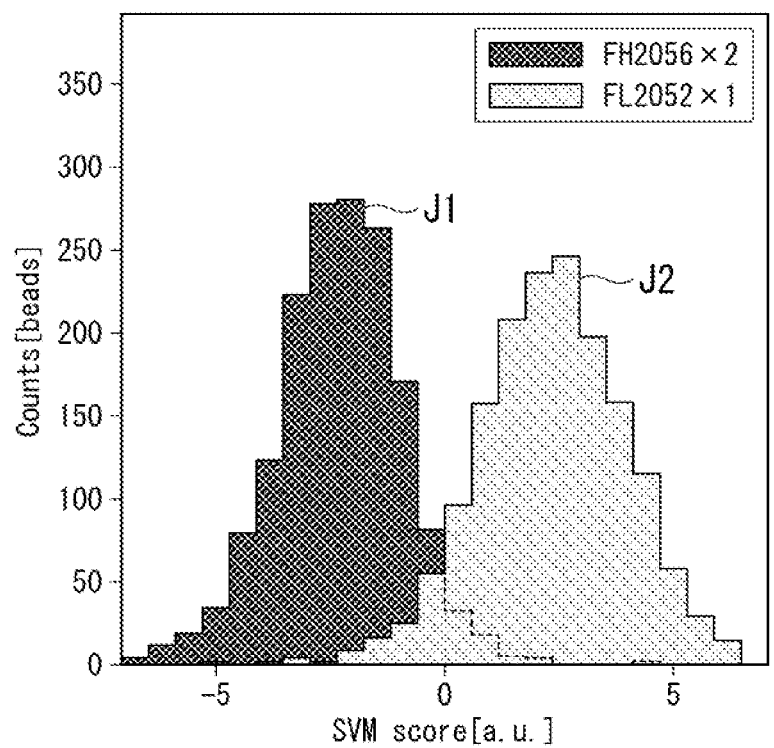
FIG. 18 is a diagram showing the results of classifying the two types of calibration beads based on the ghost cytometry technique by a flow cytometer according to Examples of the present invention.

FIG. 18 shows the results of classifying the calibration bead C1 and the calibration bead C2 contained in the standard particle suspension using the flow cytometer FCM1 based on the ghost cytometry technique. A graph J1 shows the result (score distribution) in a case in which the calibration bead C1 is classified using a model created by machine learning. A graph J2 shows the result (score distribution) of classifying the calibration bead C2 using the model created by machine learning.

As shown in FIG. 18, the structure having two particles in a particle of the calibration bead C1 and the structure having one particle in a particle of the calibration bead C2 could be satisfactorily classified based on the ghost cytometry technique. As shown in FIG. 17, the two types of calibration beads contained in the standard particle suspension had substantially the same fluorescence intensity detected at a wavelength of 525 nm, and it was difficult to classify the two calibration beads using the "total amount of the fluorescence intensity" as an index. Therefore, this result suggests that the classification based on the ghost cytometry technique can recognize the "differences in the morphology" between the calibration bead C1 and the calibration bead C2 contained in the standard particle suspension.

In the above, although the embodiments of the present invention have been described in detail with reference to the drawings, a specific configuration is not limited to the above, and various design changes and the like can be made without departing from the gist of the present invention.

REFERENCE SIGNS LIST

L, La, Lb, Lc, Ld, Le, Lf: Standard particle suspension
1, 1a, 1b, 1c, 1d, 1e, 1f, 2, 2a, 2b, 2c, 2d, 2e, 2f, 3d, 3e, 3f, 4d, 4e, 4f, 5d, 5e, 5f: Particle (calibration particle)

What is claimed is:

1. A method of evaluating performance of a flow cytometer configured to use two or more types of calibration particles having different morphologies from each other in combination, comprising:
 a first discrimination step of discriminating the two or more types of calibration particles from each other based on a first optical characteristic by the flow cytometer, wherein the flow cytometer is an evaluation target;
 a second discrimination step of discriminating the two or more types of calibration particles from each other based on a second optical characteristic which is discriminable at a spatial resolution lower than a spatial resolution at which the first optical characteristic is discriminated; and
 an evaluation step of evaluating one or both of a particle discrimination performance and a resolution of the flow cytometer based on a first discrimination result assessed in the first discrimination step and a second discrimination result assessed in the second discrimination step, wherein the two or more types of calibration particles further have third optical characteristics which are substantially same as each other.

2. The method of claim 1, wherein the two or more types of calibration particles are used in a form in which a combination of the two or more types of calibration particles is mixed in advance and contained in a standard particle suspension.

3. The method of claim 1, wherein the flow cytometer is configured to directly classify the two or more types of calibration particles, without using two-dimensional images of the two or more types of calibration particles, from time-series waveform information of an optical signal acquired based on the first optical characteristic.

4. The method of claim 3, wherein the first discrimination step is performed using ghost cytometry, and the two or more types of calibration particles are classified based on morphological information reflected in the optical signal detected as the first optical characteristic.

5. A standard particle suspension for evaluating performance of a flow cytometer,
wherein the standard particle suspension contains a combination of two or more types of calibration particles, and the two or more types of calibration particles have different first optical characteristics from each other and different second optical characteristics from each other, wherein the second optical characteristics are discriminable at a spatial resolution lower than a spatial resolution at which the first optical characteristics are discriminated, wherein the two or more types of calibration particles further have third optical characteristics which are substantially same as each other.

6. The standard particle suspension of claim 5, wherein the third optical characteristics are intensities of scattered light emitted from the two or more types of calibration particles in response to an illumination light emitted to the two or more types of calibration particles.

7. The standard particle suspension of claim 5, wherein the first optical characteristics are associated with morphologies of the two or more types of calibration particles.

8. The standard particle suspension of claim 5, wherein the second optical characteristics are wavelengths or intensities of fluorescence emitted by the two or more types of calibration particles in response to emitted light.

9. The standard particle suspension of claim 5, wherein a specific gravity of the two or more types of calibration particles with respect to the standard particle suspension is from 0.8 to 1.2.

10. The standard particle suspension of claim 5, wherein a size of the two or more types of calibration particles is at least 0.1 micrometers (μm).

11. The standard particle suspension of claim 5, wherein the two or more types of calibration particles are composed of materials containing agarose gel, polyethylene glycol, or polystyrene, or any combination thereof.

12. The standard particle suspension of claim 5, wherein a size of one or more calibration particles of the two or more types of calibration particles is at most 100 μm.

13. A method, comprising:
(a) providing a first population of particles and a second population of particles, wherein a particle of the first population of particles comprises a different morphology from an additional particle of the second population of particles, wherein (i) the particle of the first population of particles comprises a first optical characteristic, a second optical characteristic, and a third optical characteristic, and (ii) the additional particle of the second population of particles comprises a fourth optical characteristic, a fifth optical characteristic, and a sixth optical characteristic, wherein the first optical characteristic is a same first type of optical characteristic as the fourth optical characteristic, and the second optical characteristic is a same second type of optical characteristic as the fifth optical characteristic, wherein the third optical characteristic is substantially same as the sixth optical characteristic;
(b) using a flow cytometer to discriminate the particle from the additional particle using the first optical characteristic and the fourth optical characteristic, thereby generating a first result;
(c) discriminating the particle from the additional particle using the second optical characteristic and the fifth optical characteristic, thereby generating a second result, wherein the second optical characteristic and the fifth optical characteristic are discriminable at a spatial resolution lower than a spatial resolution at which the first optical characteristic and the fourth optical characteristic are discriminated; and
(d) analyzing the first result and the second result to evaluate a particle discrimination performance or a resolution of the flow cytometer.

14. The method of claim 13, wherein the first type of optical characteristic is associated with a morphology of the particle or the additional particle.

15. The method of claim 13, wherein the second type of optical characteristic is associated with a fluorescence intensity or a fluorescence wavelength of the particle or the additional particle.

16. The method of claim 13, wherein the third optical characteristic or the sixth optical characteristic are associated with an intensity of scattered light, wherein the particle is not discriminable from the additional particle.

17. The method of claim 13, wherein the analyzing, in (d), is based on a degree of coincidence between the first result and the second result.

18. A composition, comprising:
a first population of particles and a second population of particles, wherein a particle of the first population of particles comprises a different morphology from an additional particle of the second population of particles, wherein (i) the particle of the first population of particles comprises a first optical characteristic, a second optical characteristic, and a third optical characteristic, and (ii) the additional particle of the second population of particles comprises a fourth optical characteristic, a fifth optical characteristic, and a sixth optical characteristic, wherein the first optical characteristic is a same first type of optical characteristic as the fourth optical characteristic, and the second optical characteristic is a same second type of optical characteristic as the fifth optical characteristic, wherein the first optical characteristic is different from the fourth optical characteristic, wherein the second optical characteristic is different from the fifth optical characteristic, wherein the second optical characteristic and the fifth optical characteristic are discriminable at a spatial resolution lower than a spatial resolution at which the first optical characteristic and the fourth optical characteristic are discriminated, wherein the third optical characteristic is substantially same as the sixth optical characteristic.

19. The composition of claim 18, wherein the first type of optical characteristic is associated with a morphology of the particle or the additional particle.

20. The composition of claim 18, wherein the second type of optical characteristic is associated with a fluorescence intensity or a fluorescence wavelength of the particle or the additional particle.

21. The composition of claim 18, wherein the third optical characteristic or the sixth optical characteristic are associated with an intensity of scattered light of the particle or the additional particle.

* * * * *